United States Patent
Kishigami et al.

(10) Patent No.: US 9,454,987 B2
(45) Date of Patent: *Sep. 27, 2016

(54) OPTICAL INFORMATION PROCESSING APPARATUS AND OPTICAL INFORMATION PROCESSING METHOD, AND ADJUSTMENT DEVICE, ADJUSTMENT METHOD, AND ADJUSTMENT PROGRAM FOR OPTICAL INFORMATION PROCESSING APPARATUS

(71) Applicant: MITSUBISHI ELECTRIC CORPORATION, Tokyo (JP)

(72) Inventors: Tomo Kishigami, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/374,866

(22) PCT Filed: Feb. 21, 2013

(86) PCT No.: PCT/JP2013/054273
§ 371 (c)(1),
(2) Date: Jul. 25, 2014

(87) PCT Pub. No.: WO2013/140933
PCT Pub. Date: Sep. 26, 2013

(65) Prior Publication Data
US 2014/0355403 A1 Dec. 4, 2014

(30) Foreign Application Priority Data
Mar. 22, 2012 (JP) .................................. 2012-065713

(51) Int. Cl.
*G11B 7/00* (2006.01)
*G11B 7/1392* (2012.01)
(Continued)

(52) U.S. Cl.
CPC ........... *G11B 7/13925* (2013.01); *G11B 7/094* (2013.01); *G11B 7/0908* (2013.01);
(Continued)

(58) Field of Classification Search
CPC ................... G11B 7/094; G11B 2007/13727; G11B 7/0908; G11B 7/13927; G11B 7/0945; G11B 7/1378; G11B 7/13925; G11B 7/1398
USPC ........ 369/47.49, 13.11, 44.11, 44.14, 44.23, 369/44.27, 44.32, 47.17, 47.55, 369/53.12–53.15, 53.27, 53.28, 53.33, 369/53.35, 53.42, 53.37, 53.38, 53.45, 369/112.01, 112.05, 112.08, 112.23
See application file for complete search history.

(56) References Cited

U.S. PATENT DOCUMENTS 7,379,398 B2 * 5/2008 Shimamoto ........ G11B 7/13925
369/44.23
8,638,646 B2 * 1/2014 Kanatake ........... G11B 7/13925
369/44.23
(Continued)

FOREIGN PATENT DOCUMENTS

CN 1967676 A 5/2007
JP 2002-324328 A 11/2002
(Continued)

*Primary Examiner* — Dionne H Pendleton
(74) *Attorney, Agent, or Firm* — Birch, Stewart, Kolasch & Birch, LLP

(57) ABSTRACT

An optical information processing apparatus includes: a unit that radiates light onto an optical disc and detects the reflected light to output a reproduced signal; a unit that corrects spherical aberration of the light; a unit that adjusts a focus position of the light based on a focus adjustment value; and an adjustment unit that measures a characteristic of the reproduced signal at each of at least three positions on each of at least three straight lines on a plane with coordinate axes representing an amount of spherical aberration correction and focus adjustment value, obtains, from the measurements, as estimated positions, at least five positions on the plane at which the characteristic has substantially the same value, performs an ellipse approximation on the estimated positions, obtains a center of the ellipse, and determines the amount of spherical aberration correction and focus adjustment value based on the center of the ellipse.

19 Claims, 18 Drawing Sheets

(51) Int. Cl.
  *G11B 11/105* (2006.01)
  *G11B 7/09* (2006.01)
  *G11B 7/1398* (2012.01)
  *G11B 7/1372* (2012.01)
  *G11B 7/1378* (2012.01)

(52) U.S. Cl.
  CPC ........... *G11B7/0925* (2013.01); *G11B 7/0943* (2013.01); *G11B 7/0945* (2013.01); *G11B 7/1398* (2013.01); *G11B 11/10576* (2013.01); *G11B 7/1378* (2013.01); *G11B 2007/13727* (2013.01)

(56) References Cited

U.S. PATENT DOCUMENTS

| | | |
|---|---|---|
| 2003/0107961 A1 | 6/2003 | Yasuda et al. |
| 2004/0136281 A1 | 7/2004 | Yanagisawa et al. |
| 2005/0141363 A1* | 6/2005 | Shimamoto et al. ...... 369/44.29 |
| 2007/0159951 A1* | 7/2007 | Sagara .......................... 369/106 |
| 2008/0056077 A1 | 3/2008 | Miyaoka |
| 2010/0177620 A1* | 7/2010 | Shimamoto .............. 369/112.23 |
| 2010/0315912 A1 | 12/2010 | Takeda |
| 2011/0235482 A1* | 9/2011 | Kanatake ............. G11B 7/0945 369/44.32 |

FOREIGN PATENT DOCUMENTS

| | | |
|---|---|---|
| JP | 2005-267800 A | 9/2005 |
| JP | 2007-141369 A | 6/2007 |
| JP | 2007-188632 A | 7/2007 |
| JP | 2010-287276 A | 12/2010 |
| JP | 2011-96299 A | 5/2011 |
| JP | 2011-134391 A | 7/2011 |
| WO | WO 2010/067575 A1 | 6/2010 |

* cited by examiner

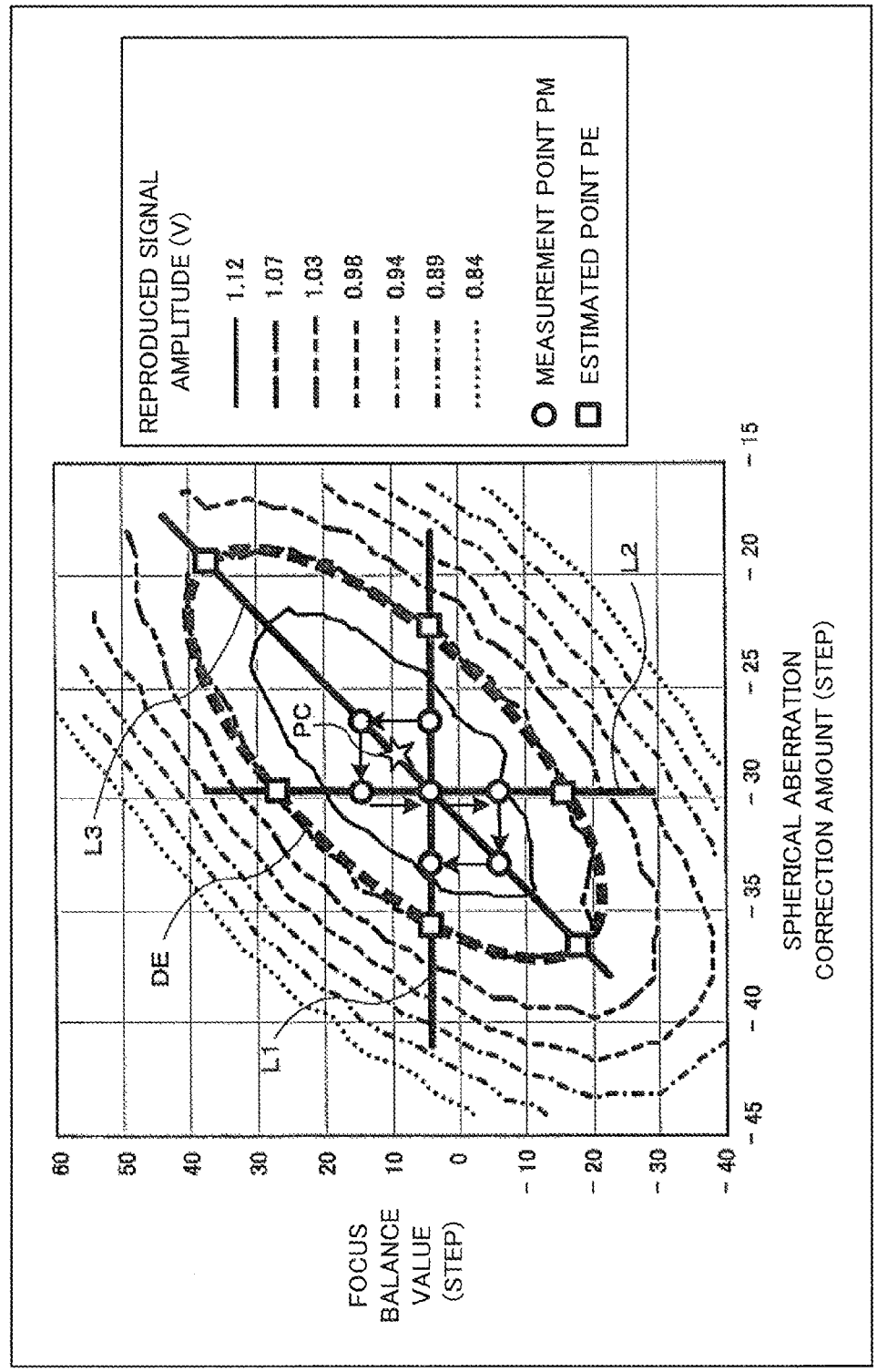

OPTICAL INFORMATION PROCESSING APPARATUS AND OPTICAL INFORMATION PROCESSING METHOD, AND ADJUSTMENT DEVICE, ADJUSTMENT METHOD, AND ADJUSTMENT PROGRAM FOR OPTICAL INFORMATION PROCESSING APPARATUS

TECHNICAL FIELD

The present invention relates to an optical information processing apparatus and an optical information processing method, and an adjustment device, an adjustment method, and an adjustment program for an optical information processing apparatus.

BACKGROUND ART

In large-capacity optical discs such as Blu-ray discs (BDs), in order to reduce an optical spot diameter formed on an optical disc, wavelengths of lasers have become shorter, and numerical apertures (NAs) of objective lenses have become larger. For example, the DVD (Digital Versatile Disc) uses a laser with a wavelength of 650 nm and an objective lens with an NA of 0.65; the BD uses a laser with a wavelength of 405 nm and an objective lens with an NA of 0.85. In general, it is known that the variation of the thickness of a protective layer for protecting an information recording layer of an optical disc generates spherical aberration, and an amount of the generated spherical aberration is proportional to approximately the fourth power of the NA and inversely proportional to the wavelength. Thus, the spherical aberration generated during BD reproduction is approximately 6.5 ($\approx\{(0.85/0.6)^4\}\times(650/405)$) times as large as that generated during DVD reproduction. Since the BD reproduction is susceptible to the spherical aberration, it uses a spherical aberration correction means for correcting spherical aberration.

In reproduction of an optical disc, a focus servo control for controlling the position of an objective lens in a direction perpendicular to an information recording surface of the optical disc so that the focus position of laser light follows the information recording surface of the optical disc is performed.

It is desirable that an amount of spherical aberration correction by the spherical aberration correction means and a focus balance value (or focus position) in the focus servo control are adjusted to provide good reproduction quality. However, both are adjustments in an optical axis direction, and affect each other. Thus, techniques for properly adjusting both of the amount of spherical aberration correction and focus balance value (or focus position) are proposed.

Patent Document 1 describes a technique for optimally adjusting a focus balance and a spherical aberration correction amount in an optical pickup device including an objective lens for focusing a light beam on an optical disc and a spherical aberration correction mechanism. This technique obtains tracking error signals (TES signals) at a plurality of combinations of the focus balance and spherical aberration correction amount, selects combinations at which the TES signal is not less than a predetermined level, obtains light intensity signals (RF signals) at the selected combinations, and selects a combination of the focus balance and spherical aberration correction amount having the largest signal level of the RF signal.

Patent Document 2 describes a technique for adjusting the position of a movable lens for correcting spherical aberration and a focus balance value so as to maximize the amplitude level of a tracking error signal (TE signal). This technique obtains in advance, from a graph that has a horizontal axis representing one of the position of the movable lens and focus balance value and a vertical axis representing the other and depicts a contour line of the amplitude level of the TE signal, an inclination α of the long axis of the contour line, which is substantially an ellipse, with respect to the horizontal axis; it seeks a condition in which the amplitude level of the TE signal is maximum by changing either one of the position of the movable lens and focus balance value, and then seeks a condition in which the amplitude level of the TE signal is maximum, along an adjustment line having the inclination α and passing through the found position of the movable lens and focus balance value.

Patent Document 3 describes a technique for two-dimensionally seeking a combination of a focus position and a spherical aberration amount at which the jitter value is optimum, by changing the focus position and spherical aberration amount. Specifically, it discloses: a method that alternates between seeking the focus position at which the jitter value is minimum and seeking the spherical aberration amount at which the jitter value is minimum; a method that repeats a process for determining the point having the smallest jitter value among the four vertexes and center of a rectangular in a graph having axes representing the focus position and spherical aberration amount, while reducing the sides of the rectangular; a method that seeks focus position X1 having the minimum jitter value at spherical aberration amount Y1, seeks focus position X2 having the minimum jitter value at spherical aberration amount Y2, and seeks the point having the minimum jitter value on the straight line connecting the point (X1, Y1) and point (X2, Y2); and a method that seeks the point having the minimum jitter value on a straight line with a predetermined slope a, and then seeks the point having the minimum jitter value on the straight line with a slope of (−1(a) passing through the point.

Patent Document 4 describes a technique for adjusting a spherical aberration correction value and a focus bias value to the optimum values. This technique repeats an operation of measuring jitter values at eight points on the outline of a required assumed margin range on a plane having axes representing the spherical aberration correction value and focus bias value and determining the largest of the jitter values as a representative value, while moving the required assumed margin range in a direction having a predetermined inclination A, and then, using the center of the required assumed margin range in which the smallest representative value has been obtained as an initial point, while moving the required assumed margin range in a direction having a predetermined inclination B, repeats the above operation, specifying the center of the required assumed margin range in which the smallest representative value has been obtained.

PRIOR ART REFERENCES

Patent References

Patent Document 1: Japanese Patent Application Publication No. 2011-134391

Patent Document 2: Japanese Patent Application Publication No. 2010-287276

Patent Document 3: Japanese Patent Application Publication No. 2007-188632

Patent Document 4: Japanese Patent Application Publication No. 2007-141369

SUMMARY OF THE INVENTION

Problems to be Solved by the Invention

The techniques described in Patent Documents 1 to 4 measure amplitude levels or jitter values at many measurement points in the adjustment of an amount of spherical aberration correction and an adjustment value (e.g., focus balance value) for a focus position, and therefore the adjustment requires a long time.

An object of the present invention is to provide an optical information processing apparatus and an optical information processing method, and an adjustment device, an adjustment method, and an adjustment program for an optical information processing apparatus that can adjust the amount of spherical aberration correction and the focus adjustment value with a small number of measurement points.

Means for Solving the Problems

An optical information processing apparatus according to the present invention includes:

a light radiation reception means for radiating light onto an optical disc and detecting light reflected from the optical disc to output a reproduced signal;

a spherical aberration correction means for correcting spherical aberration of the light radiated onto the optical disc;

a focus adjustment means for adjusting, based on a focus adjustment value, a focus position of the light radiated onto the optical disc; and an adjustment means for measuring a signal characteristic of the reproduced signal at each of at least three measurement positions on each of at least three straight lines on a plane with coordinate axes representing an amount of spherical aberration correction by the spherical aberration correction means and the focus adjustment value, obtaining, from the results of the measurements, as estimated positions, at least five positions on the plane at which the signal characteristic has substantially the same value, and adjusting the amount of spherical aberration correction and the focus adjustment value based on the at least five estimated positions.

An optical information processing method according to the present invention includes:

a light radiation reception step for radiating light onto an optical disc and detecting light reflected from the optical disc to output a reproduced signal;

a spherical aberration correction step for correcting spherical aberration of the light radiated onto the optical disc;

a focus adjustment step for adjusting, based on a focus adjustment value, a focus position of the light radiated onto the optical disc; and an adjustment step for measuring a signal characteristic of the reproduced signal at each of at least three measurement positions on each of at least three straight lines on a plane with coordinate axes representing an amount of spherical aberration correction by the spherical aberration correction step and the focus adjustment value, obtaining, from the results of the measurements, as estimated positions, at least five positions on the plane at which the signal characteristic has substantially the same value, and adjusting the amount of spherical aberration correction and the focus adjustment value based on the at least five estimated positions.

An adjustment device for an optical information processing apparatus according to the present invention is an adjustment device for an optical information processing apparatus including a light radiation reception means for radiating light onto an optical disc and detecting light reflected from the optical disc to output a reproduced signal, a spherical aberration correction means for correcting spherical aberration of the light radiated onto the optical disc, and a focus adjustment means for adjusting a focus position of the light radiated onto the optical disc based on a focus adjustment value, the adjustment device including an adjustment means for measuring a signal characteristic of the reproduced signal at each of at least three measurement positions on each of at least three straight lines on a plane with coordinate axes representing an amount of spherical aberration correction by the spherical aberration correction means and the focus adjustment value, obtaining, from the results of the measurements, as estimated positions, at least five positions on the plane at which the signal characteristic has substantially the same value, and adjusting the amount of spherical aberration correction and the focus adjustment value based on the at least five estimated positions.

An adjustment method for an optical information processing apparatus according to the present invention is an adjustment method for an optical information processing apparatus including a light radiation reception means for radiating light onto an optical disc and detecting light reflected from the optical disc to output a reproduced signal, a spherical aberration correction means for correcting spherical aberration of the light radiated onto the optical disc, and a focus adjustment means for adjusting a focus position of the light radiated onto the optical disc based on a focus adjustment value, the adjustment method including an adjustment step for measuring a signal characteristic of the reproduced signal at each of at least three measurement positions on each of at least three straight lines on a plane with coordinate axes representing an amount of spherical aberration correction by the spherical aberration correction means and the focus adjustment value, obtaining, from the results of the measurements, as estimated positions, at least five positions on the plane at which the signal characteristic has substantially the same value, and adjusting the amount of spherical aberration correction and the focus adjustment value based on the at least five estimated positions.

An adjustment program for an optical information processing apparatus according to the present invention is an adjustment program for an optical information processing apparatus including a light radiation reception means for radiating light onto an optical disc and detecting light reflected from the optical disc to output a reproduced signal, a spherical aberration correction means for correcting spherical aberration of the light radiated onto the optical disc, and a focus adjustment means for adjusting a focus position of the light radiated onto the optical disc based on a focus adjustment value, the adjustment program causing a computer to execute an adjustment step for measuring a signal characteristic of the reproduced signal at each of at least three measurement positions on each of at least three straight lines on a plane with coordinate axes representing an amount of spherical aberration correction by the spherical aberration correction means and the focus adjustment value, obtaining, from the results of the measurements, as estimated positions, at least five positions on the plane at which the signal characteristic has substantially the same value, and adjusting the amount of spherical aberration correction and the focus adjustment value based on the at least five estimated positions.

Effect of the Invention

According to the present invention, it is possible to adjust the amount of spherical aberration correction and the focus adjustment value with a small number of measurement points.

BRIEF DESCRIPTION OF THE DRAWINGS

FIG. 10 is a diagram showing the distribution of the reproduced signal amplitude with respect to the spherical aberration correction amount and focus balance value, and an example of measurement points, estimated points, an ellipse, and an ellipse center in the first embodiment.

MODES FOR CARRYING OUT THE INVENTION

Embodiments of the invention will now be described with reference to the drawings.

First Embodiment

Figure 1:
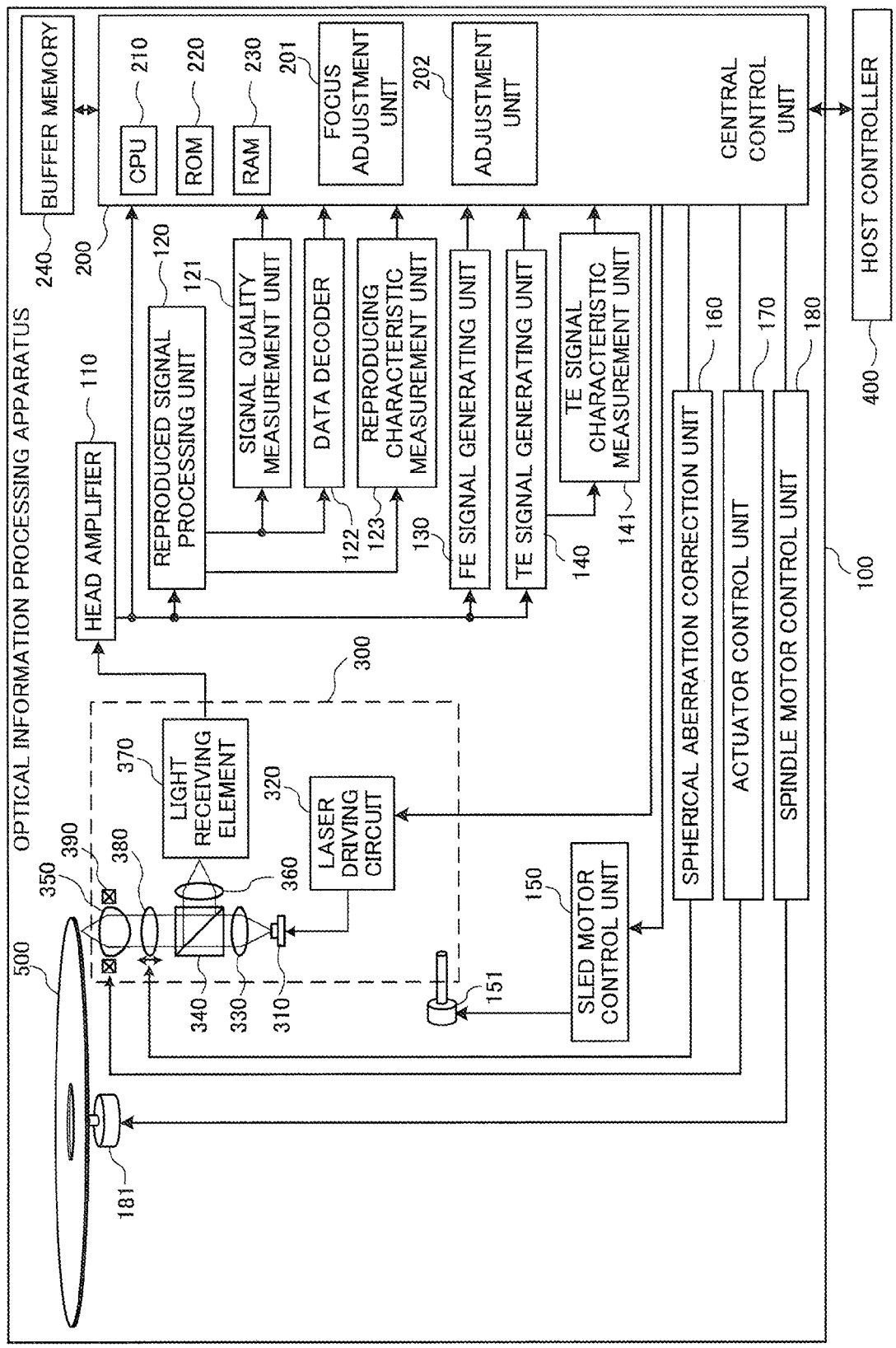
FIG. 1 is a view showing an exemplary configuration of an optical information processing apparatus in a first embodiment.

FIG. 1 is a view showing an exemplary configuration of the optical information processing apparatus 100 in the first embodiment. The optical information processing apparatus 100 is an apparatus for processing information of an optical disc and is, for example, an optical recording/reproducing apparatus for performing at least one of recording and reproduction of information on an optical disc. In the example of FIG. 1, the optical information processing apparatus 100 is a reproducing apparatus for reproducing an optical disc 500, which is a BD.

In FIG. 1, the optical information processing apparatus 100 includes a head amplifier 110, a reproduced signal processing unit 120, a signal quality measurement unit 121, a data decoder 122, a reproducing characteristic measurement unit 123, an FE signal generating unit 130, a TE signal generating unit 140, a TE signal characteristic measurement unit 141, a sled motor control unit 150, a sled motor 151, a spherical aberration correction unit 160, an actuator control unit 170, a spindle motor control unit 180, a spindle motor 181, a central control unit 200, a buffer memory 240, and an optical head 300.

The spindle motor control unit 180 controls the spindle motor 181 to rotate the optical disc 500 at a desired rotational speed. The sled motor control unit 150 controls the sled motor 151 to move the optical head 300 to a desired position (in a radial direction of the optical disc 500, for example).

The optical head 300 radiates light onto the optical disc 500 and detects light reflected from the optical disc 500 to output a reproduced signal, and is also referred to as an optical pickup. The optical head 300 includes a semiconductor laser 310, a laser driving circuit 320, a collimator lens 330, a beam splitter 340, an objective lens 350, a detection lens 360, a light receiving element 370, a spherical aberration correction lens 380, and an actuator 390. Among these, the semiconductor laser 310, collimator lens 330, beam splitter 340, objective lens 350, detection lens 360, and spherical aberration correction lens 380 constitute an optical system.

The semiconductor laser 310 is driven by the laser driving circuit 320 to emit laser light having an output value (reproducing power) necessary for data reproduction. The laser light emitted from the semiconductor laser 310 is focused and radiated on the optical disc 500 through the collimator lens 330, beam splitter 340, spherical aberration correction lens 380, and objective lens 350. The reflected light from the optical disc 500 passes through the objective lens 350 and spherical aberration correction lens 380, is separated from the incident light by the beam splitter 340, and is received through the detection lens 360 by the light receiving element 370.

The spherical aberration correction lens 380 is a movable lens for correcting spherical aberration of the laser light radiated on the optical disc 500, and is disposed in the optical system of the optical head 300. The spherical aberration correction lens 380 is disposed movably in a direction of an optical axis of the laser light, and is controlled by the spherical aberration correction unit 160.

The actuator 390 holds the objective lens 350 and drives the objective lens 350 in a focus direction and a tracking direction, and is controlled by the actuator control unit 170. The focus direction is a direction parallel to the direction of an axis of rotation of the optical disc 500, that is, a direction perpendicular to an information recording surface of the optical disc 500; the tracking direction is a direction parallel to the radial direction of the optical disc 500.

The light receiving element (or photodetector) 370 converts the received optical signal into an electrical signal as the reproduced signal. The electrical signal converted by the light receiving element 370 is supplied through the head amplifier 110 to the central control unit 200, reproduced signal processing unit 120, FE signal generating unit 130, and TE signal generating unit 140.

The central control unit 200 decodes the signal supplied from the head amplifier 110 to obtain address information indicating the current position of the optical head 300. Then, the central control unit 200 provides the sled motor control unit 150 with the difference between the obtained address information of the current position and address information indicating a position (access target position) to be accessed, thereby controlling the sled motor 151 to move the optical head 300 to the access target position.

The FE signal generating unit 130 processes the signal from the head amplifier 110 to generate a focus error signal (FE signal). As a method for generating the FE signal, a known method, such as an astigmatism method, a knife-edge method, and a spot size detection method, may be used.

The TE signal generating unit 140 processes the signal from the head amplifier 110 to generate a tracking error signal (TE signal). As a method for generating the TE signal, a known method, such as a push-pull method, a DPP (Differential Push-Pull) method, and a DPD (Differential Phase Detection) method, may be used.

The reproduced signal processing unit 120 equalizes (wave-shapes) the signal from the head amplifier 110 and supplies the equalized signal to the signal quality measurement unit 121 and data decoder 122. The reproduced signal processing unit 120 supplies the electrical signal before equalization to the reproducing characteristic measurement unit 123.

The reproducing characteristic measurement unit 123 measures, based on the signal from the reproduced signal processing unit 120, an amplitude (reproduced signal amplitude) of the reproduced signal as a signal characteristic (reproduced signal characteristic) of the reproduced signal.

The signal quality measurement unit 121 measures, based on the signal from the reproduced signal processing unit 120, a quality (reproduced signal quality) of the reproduced signal, such as a jitter value, an i-MLSE (integrated Maximum Likelihood Sequence error Estimation) value, and an error rate, as a signal characteristic of the reproduced signal.

The data decoder 122 binarizes the reproduced signal supplied from the reproduced signal processing unit 120 by signal processing such as PRML (Partial Response Maximum Likelihood), and then, by performing processing such as demodulation and error correction, generates (reproduces) the data recorded on the optical disc 500, sending it to the central control unit 200. The central control unit 200 stores the data generated by the data decoder 122 in the buffer memory 240, and then sends the data to a host controller 400 connected to the optical information processing apparatus 100.

The TE signal characteristic measurement unit 141 measures a TE signal characteristic, such as an amplitude and a TE signal balance, of the TE signal generated by the TE signal generating unit 140.

The spherical aberration correction unit 160 adjusts, based on a control signal from the central control unit 200, the position of the spherical aberration correction lens 380 to correct the spherical aberration. The spherical aberration correction unit 160 moves the position of the spherical aberration correction lens 380 in the optical axis direction, thereby changing an amount of spherical aberration correction by the spherical aberration correction lens 380. The amount (hereinafter referred to as the 'spherical aberration correction amount') of spherical aberration correction corresponds to the position of the spherical aberration correction lens 380.

This example illustrates a configuration that performs the spherical aberration correction by using the spherical aberration correction lens 380, but the spherical aberration correction may be performed by another configuration such as a liquid crystal element. When a liquid crystal element is used, the spherical aberration correction unit 160 may change the spherical aberration correction amount by changing a voltage applied to the liquid crystal element.

The actuator control unit 170 controls, based on a control signal from the central control unit 200, the actuator 390 to drive the objective lens 350 in the focus direction and tracking direction.

The central control unit 200 controls the entire apparatus when the optical information processing apparatus 100 reads information from the optical disc 500 and performs other operations, receiving the reproduced signal quality such as the jitter from the signal quality measurement unit 121, the reproduced signal amplitude from the reproducing characteristic measurement unit 123, the FE signal from the FE signal generating unit 130, the TE signal from the TE signal generating unit 140, the TE signal characteristic such as the TE signal amplitude and TE signal balance value from the TE signal characteristic measurement unit 141, and the reproduced data from the data decoder 122, and giving control signals to the laser driving circuit 320, sled motor control unit 150, the spherical aberration correction unit 160, actuator control unit 170, and spindle motor control unit 180.

The central control unit 200 gives, based on the TE signal, the control signal to the actuator control unit 170 to control the actuator 390, thereby performing a tracking servo control for controlling the position of the objective lens 350 in the tracking direction so that an optical spot of the laser light follows a track on the optical disc 500. The central control unit 200 also gives, based on the FE signal, the control signal to the actuator control unit 170 to control the actuator 390, thereby performing a focus servo control for controlling the position of the objective lens 350 in the focus direction so that the focus position of the laser light follows the information recording surface of the optical disc 500.

The central control unit 200 has a focus adjustment function for adjusting the focus position of the laser light radiated on the optical disc 500 based on a focus adjustment value. The focus adjustment value is an adjustment value for adjusting the focus position, and is a parameter corresponding to or indicating the focus position (or the position of the objective lens). In this example, the central control unit 200 adjusts, based on a focus balance value as the focus adjustment value, the position of the objective lens 350 in the focus direction to adjust the focus position. Here, a focus balance means a balance of a S-shaped curve indicating a characteristic of the FE signal (focus error signal), which is obtained by receiving the reflected light from the optical disc 500; the focus balance value is a balance value of the S-shaped curve of the FE signal. The focus balance value can be changed, for example, by adjusting a gain of the head amplifier 110 or an offset added to the FE signal. For example, the central control unit 200 performs the focus servo control while adding an offset to the FE signal, and when changing the focus balance value, changes the offset added to the FE signal. While the focus servo control is being performed, when the focus balance value is changed, the position of the objective lens 350 in the focus direction is changed, and the focus position of the laser light is changed. Thus, for example, the central control unit 200 adjusts the focus position to a position corresponding to a desired focus balance value by adding an offset corresponding to the desired focus balance value to the FE signal.

The central control unit 200 further performs an adjustment process for adjusting (or optimizing) the spherical aberration correction amount and focus adjustment value. This adjustment process will be detailed later. The spherical aberration correction amount and focus adjustment value determined by the adjustment process are used, for example, in reproducing or recording information on the optical disc 500. For example, before reproduction or recording, the central control unit 200 determines an optimum combination of the spherical aberration correction amount and focus balance value. Then, the central control unit 200 moves the spherical aberration correction lens 380 to the position corresponding to the determined spherical aberration correction amount and performs the focus servo control while adding the offset corresponding to the determined focus balance value to the FE signal, performing the reproduction or recording with respect to the optical disc 500.

FIG. 1 shows a focus adjustment unit 201 that provides the focus adjustment function, and an adjustment unit 202 that performs the adjustment process of the spherical aberration correction amount and focus adjustment value.

The central control unit 200 includes, for example, a CPU (Central Processing Unit) 210, a ROM (Read Only Memory) 220 storing a program for operation of the CPU 210, and a RAM (Random Access Memory) 230 for storing data. The program stored in the ROM 220 includes an adjustment process program for adjusting the spherical aberration correction amount and focus balance value, described later, and a portion defining measurement conditions and the like. The program may be provided by being recorded on a computer-readable medium such as an optical disc, or may be provided through a communication line such as the Internet. The functions of the central control unit 200 may be implemented by only hardware circuits.

A relationship between the spherical aberration correction amount and the focus balance value will now be described. The following description takes, as an example, results obtained by actually measuring the reproduced signal amplitude and reproduced signal quality with respect to the second layer (L1 layer or middle layer) of the three layers of a triple-layer BD-RE (Rewritable) while changing the spherical aberration correction amount and focus balance value.

Figure 2:
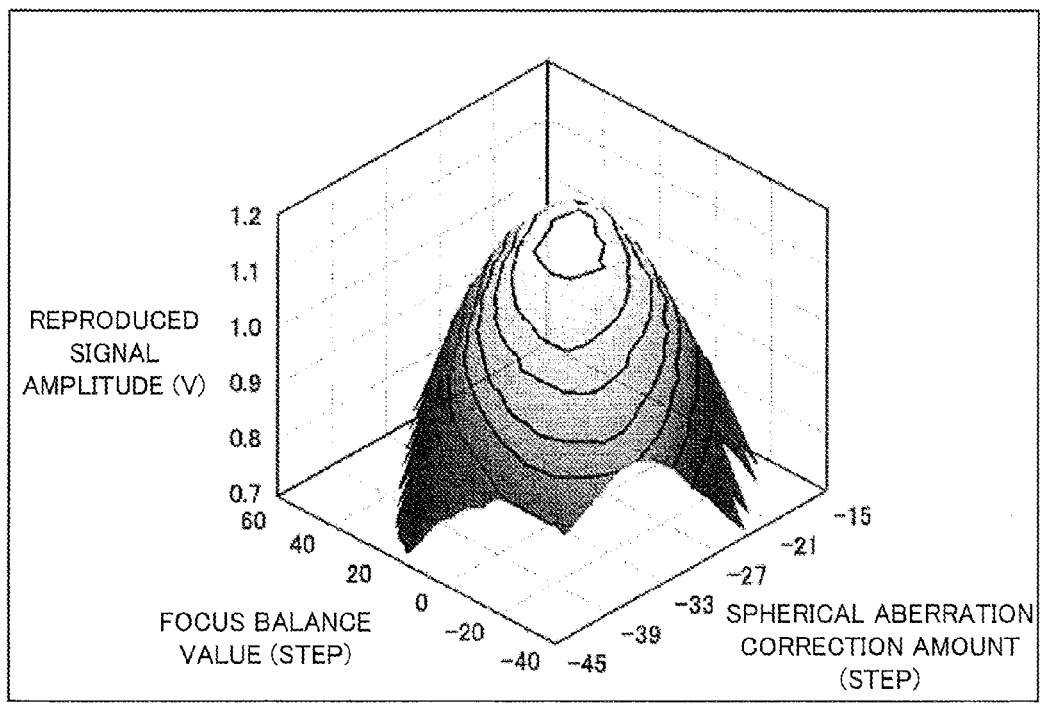
FIG. 2 is a graph showing an example of a relationship between a spherical aberration correction amount and a focus balance value and a reproduced signal amplitude.

FIG. 2 is a graph showing an example of the relationship between the spherical aberration correction amount and focus balance value and the reproduced signal amplitude. The solid lines in FIG. 2 represent contour lines of the reproduced signal amplitude at multiple reproduced signal amplitude levels. In FIG. 2, the reproduced signal amplitude is maximum near the center of the graph.

Figure 3:
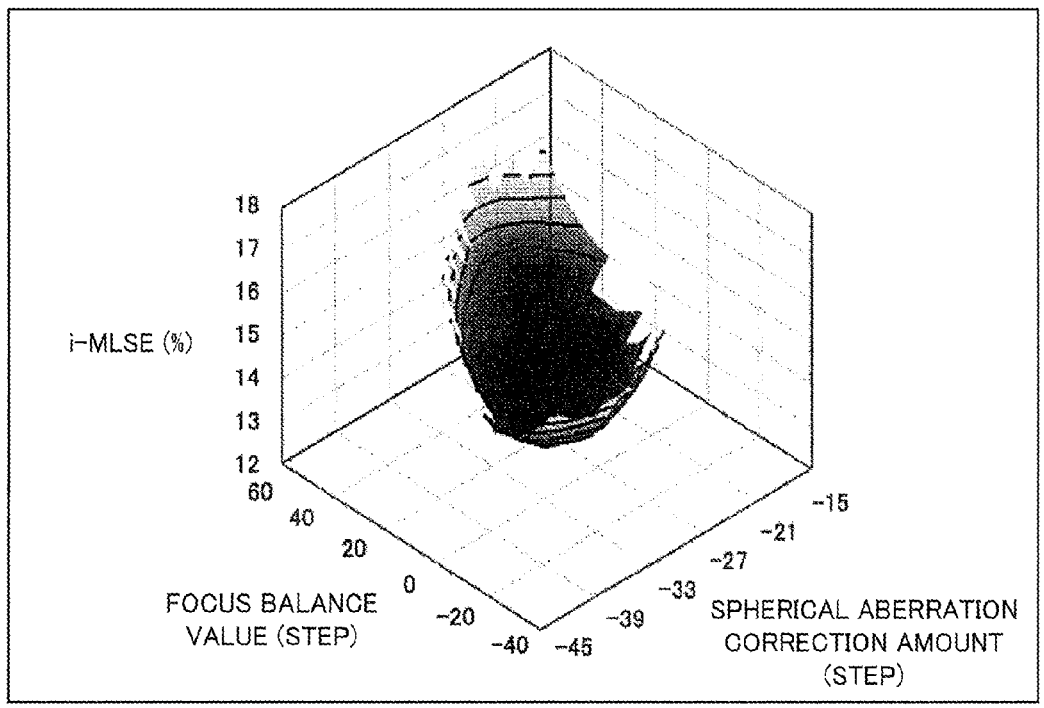
FIG. 3 is a graph showing an example of a relationship between the spherical aberration correction amount and the focus balance value and a reproduced signal quality.

FIG. 3 is a graph showing an example of the relationship between the spherical aberration correction amount and focus balance value and the reproduced signal quality (i-MLSE value). The solid lines in FIG. 3 represent contour lines of the i-MLSE value at multiple i-MLSE levels. In FIG. 3, the reproduced signal quality is maximum (minimum) near the center of the graph.

In order to reproduce information from the optical disc 500 in high quality, it is preferable that the optical information processing apparatus 100 finds the combination of the spherical aberration correction amount and focus balance value at which the reproduced signal quality is maximum (minimum) in FIG. 3. The position of the combination of the spherical aberration correction amount and focus balance value at which the reproduced signal quality is maximum (minimum) in FIG. 3 is slightly displaced from, but still close to the position of the combination of the spherical aberration correction amount and focus balance value at which the reproduced signal amplitude is maximum in FIG. 2. Thus, it is also preferable to find the combination of the spherical aberration correction amount and focus balance value at which the reproduced signal amplitude is maximum.

In general, the time required for measuring the reproduced signal amplitude is shorter than that required for measuring the reproduced signal quality. Therefore, in view of adjustment time, it is desirable to use the reproduced signal amplitude for the adjustment.

The determination of a point near the combination of the spherical aberration correction amount and focus balance value at which the reproduced signal quality or reproduced signal amplitude is maximum makes it possible to ensure the margin of reproduction quality.

Figure 4:
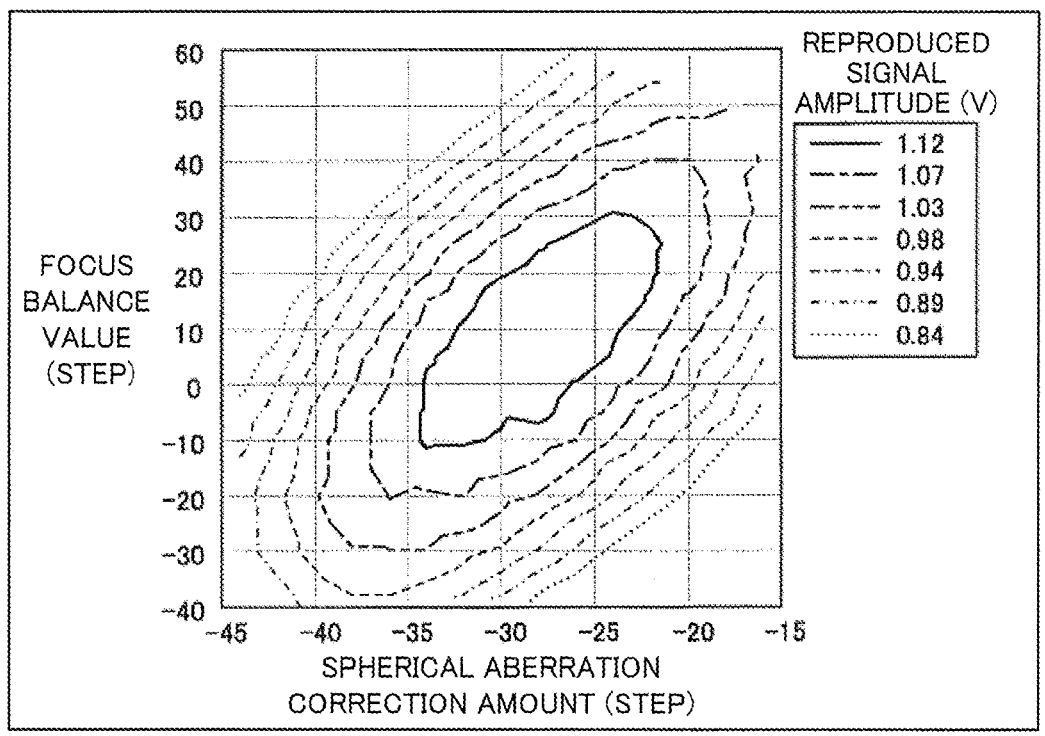
FIG. 4 is a graph showing an example of the distribution of the reproduced signal amplitude with respect to the spherical aberration correction amount and focus balance value.

FIG. 4 is a graph showing an example of the distribution of the reproduced signal amplitude with respect to the spherical aberration correction amount and focus balance value. FIG. 4 is obtained by projecting the contour lines of the reproduced signal amplitude in FIG. 2 onto an x-y coordinate system (two-dimensional plane) in which the x-coordinate represents the spherical aberration correction amount and the y-coordinate represents the focus balance value. As shown in FIG. 4, the contour lines have substantially elliptical shapes obliquely inclined to both the x- and y-axes. It can be seen that the centers of the ellipses of the different reproduced signal amplitudes are located at substantially the same position. Therefore, if the center of the ellipse corresponding to one of the counter lines can be obtained, a position at which the reproduced signal amplitude is maximum or near maximum (i.e., optimum or near optimum combination of the spherical aberration correction amount and focus balance value) can be obtained.

Figure 5:
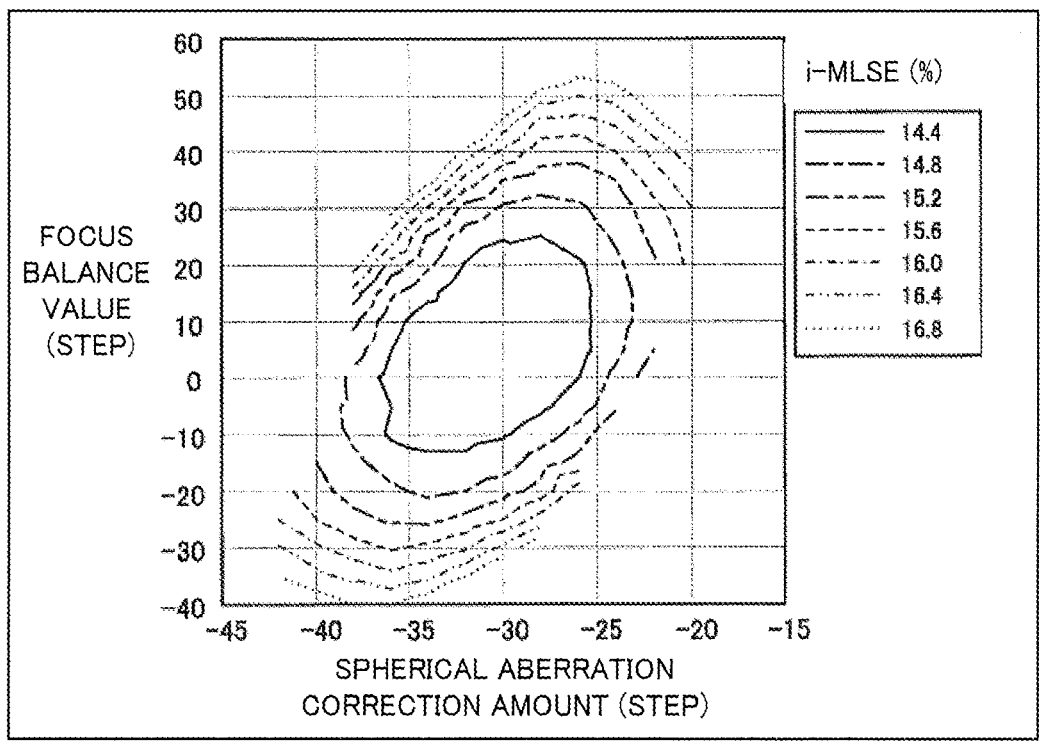
FIG. 5 is a graph showing an example of the distribution of the reproduced signal quality with respect to the spherical aberration correction amount and focus balance value.

FIG. 5 is a graph showing an example of the distribution of the reproduced signal quality (i-MLSE) with respect to the spherical aberration correction amount and focus balance value. FIG. 5 is obtained by projecting the contour lines of the reproduced signal quality in FIG. 3 onto the x-y coordinate system, as in FIG. 4. In FIG. 5, the contour lines have substantially elliptical shapes obliquely inclined, as in FIG. 4. It can be seen that the centers of the ellipses of the different reproduced signal qualities are located at substantially the same position. Therefore, if the center of the ellipse corresponding to one of the counter lines can be obtained, a position at which the reproduced signal quality is maximum or near maximum (i.e., optimum or near optimum combination of the spherical aberration correction amount and focus balance value) can be obtained.

Figure 6:
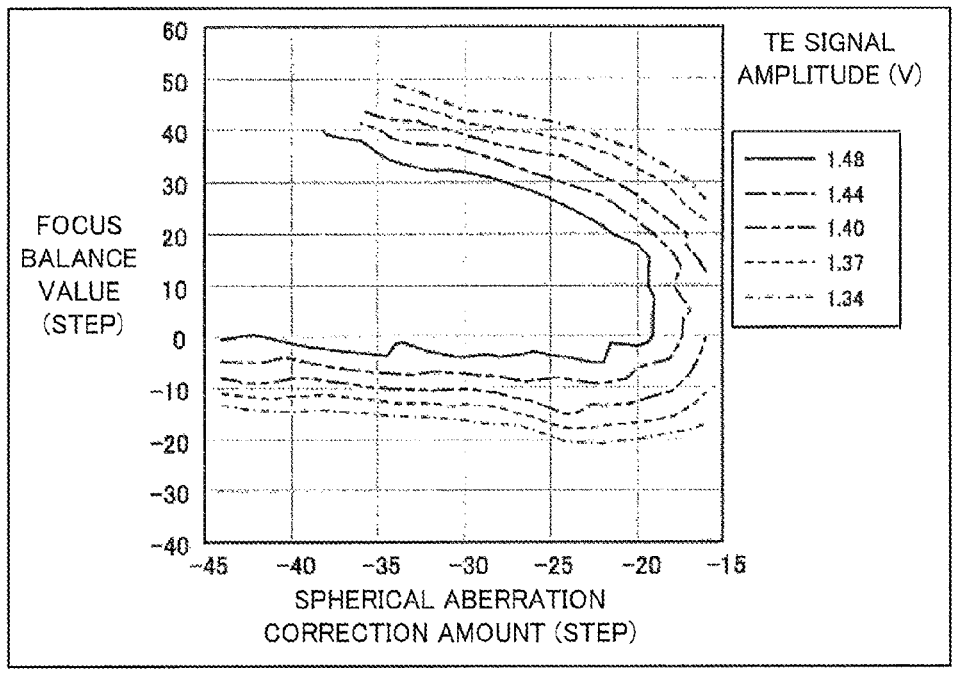
FIG. 6 is a graph showing an example of the distribution of a tracking error signal (TE signal) with respect to the spherical aberration correction amount and focus balance value.

FIG. 6 is a graph showing an example of the distribution of the tracking error signal (TE signal) with respect to the spherical aberration correction amount and focus balance value. FIG. 6 is obtained by projecting contour lines of the TE signal amplitude at multiple TE signal amplitude levels onto the x-y coordinate system. From FIG. 6, it can be seen that the variation of the TE signal amplitude is small in the direction (x-axis direction) in which the spherical aberration correction amount varies, and the contour line distribution is different from those in FIGS. 4 and 5. If the amplitude of the TE signal becomes too small, the tracking servo becomes easy to deviate, and if the adjustment is performed in such a condition, extra time may be required for a retry process that restarts the tracking servo or other processes. In FIG. 6, even when the TE signal amplitude is 1.34 V, which is the smallest value in FIG. 6, the tracking servo does not easily deviate. However, if the TE signal amplitude becomes even smaller than 1.34 V due to, for example, change of the focus balance value, it is highly likely that the tracking servo becomes easy to deviate. Thus, for stable operation of the tracking servo, it is necessary to be careful not to change the focus balance value too much from the range shown in FIG. 6 (e.g., range inside the contour line of 1.34 V).

Figure 7:
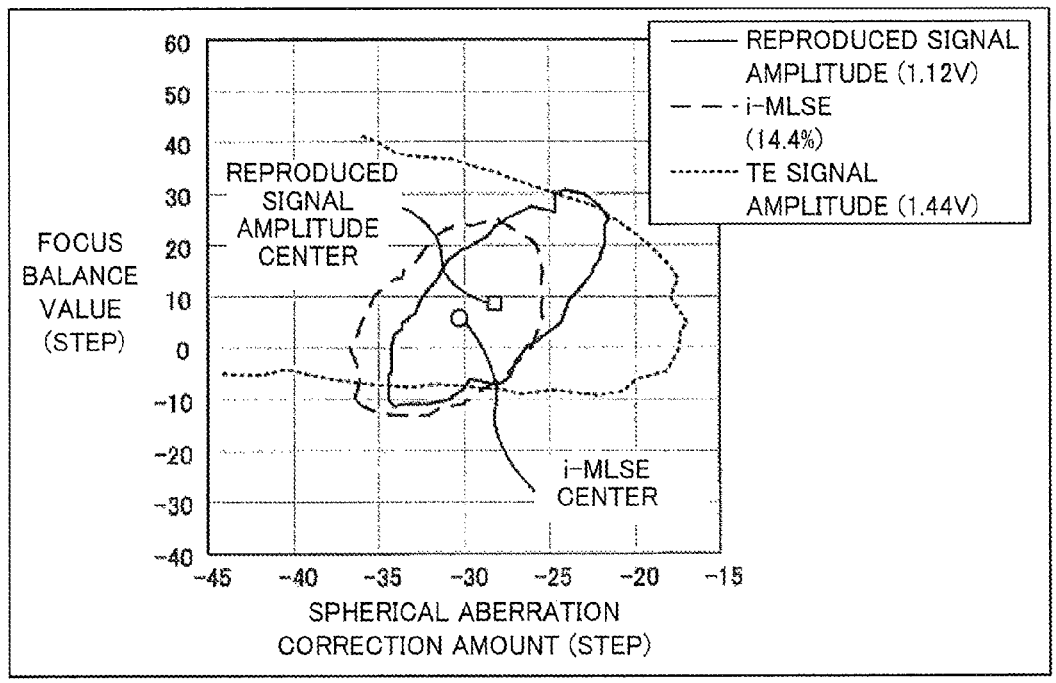
FIG. 7 is a graph obtained by extracting one of the contour lines of each of the reproduced signal amplitude, reproduced signal quality, and TE signal amplitude and depicting them on the same x-y coordinate system.

FIG. 7 is a graph showing an example of the distributions of the reproduced signal amplitude, reproduced signal quality, and TE signal amplitude with respect to the spherical aberration correction amount and focus balance value. FIG. 7 is obtained by extracting the contour line of the reproduced signal amplitude of 1.12 V, the contour line of the i-MLSE of 14.4%, and the contour line of the TE signal amplitude of 1.44 V from the contour lines shown in FIGS. 4, 5, and 6, and depicting them on the same x-y coordinate system. In the graph, the square mark represents the center of the ellipse when the contour line of the reproduced signal amplitude is assumed to be substantially an ellipse; the circle mark represents the center of the ellipse when the contour line of the i-MLSE is assumed to be substantially an ellipse. From FIG. 7, it can be seen that the ellipse centers of the reproduced signal amplitude and i-MLSE are different from each other in both the spherical aberration correction amount and focus balance value by only several steps, and are relatively close to each other. This also shows that high quality reproduction can be achieved by adjusting the spherical aberration correction amount and focus balance value so as to maximize the reproduced signal amplitude.

Figure 8A:
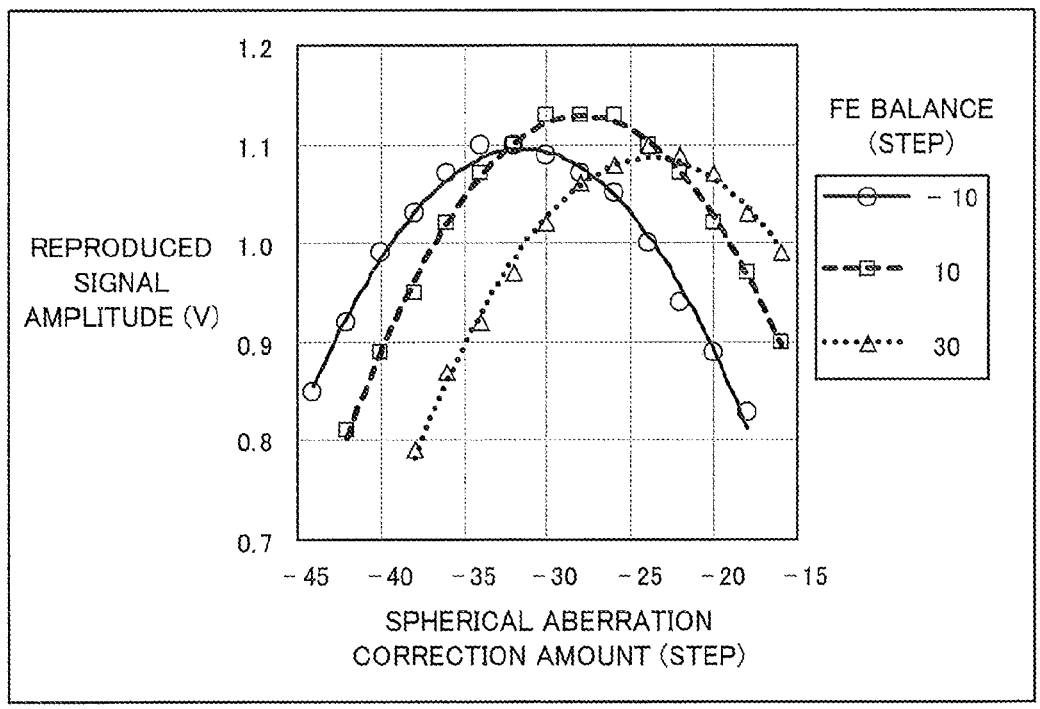
FIG. 8(a) is a graph showing an example of a relationship between the spherical aberration correction amount and the reproduced signal amplitude.

FIG. 8(a) is a graph showing relationships between the spherical aberration correction amount and the reproduced signal amplitude. Among the relationship between the spherical aberration correction amount and focus balance value and the reproduced signal amplitude in FIG. 2, FIG. 8(a) shows the relationships between the spherical aberration correction amount and the reproduced signal amplitude at focus balance values of '−10', '10', and '30'. The focus balance value '10' is a focus balance value when the reproduced signal amplitude is near maximum; the focus balance values '−10' and '30' are focus balance values shifted from the focus balance value '10' by ±20 steps. The circle, square, and triangle marks in the graph represent the actual measurement values obtained in the measurement of the relationship in FIG. 2, and correspond to the cases of the focus balance values '−10', '10', and '30', respectively. The solid, dashed, and dotted lines are approximation curves obtained by approximating the actual measurement values of the circle, square, and triangle marks by quadratic equations, respectively. From FIG. 8(a), it can be seen that the relationship between the spherical aberration correction amount and the reproduced signal amplitude can be approximated by a quadratic equation in each case.

Figure 8B:
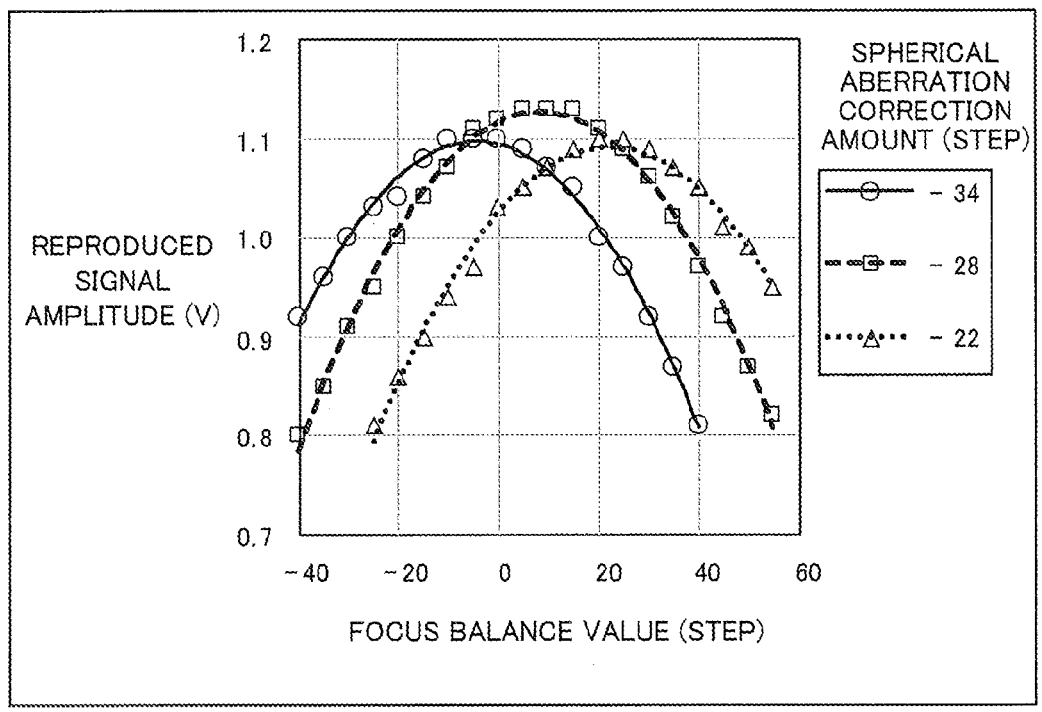
FIG. 8(b) is a graph showing an example of a relationship between the focus balance value and the reproduced signal amplitude.

FIG. 8(b) is a graph showing relationships between the focus balance value and the reproduced signal amplitude. Among the relationship between the spherical aberration correction amount and focus balance value and the reproduced signal amplitude in FIG. 2, FIG. 8(b) shows the relationships between the focus balance value and the reproduced signal amplitude at spherical aberration correction amounts of '−34', '−28', and '−22'. The spherical aberration correction amount '−28' is a spherical aberration correction amount when the reproduced signal amplitude is near maximum; the spherical aberration correction amounts '−34' and '−22' are spherical aberration correction amounts shifted from the spherical aberration correction amount '−28' by ±6 steps. The circle, square, and triangle marks in the graph represent the actual measurement values obtained in the measurement of the relationship in FIG. 2, and correspond to the cases of the spherical aberration correction amounts '−34', '−28', and '−22', respectively. The solid, dashed, and dotted lines are approximation curves obtained by approximating the actual measurement values of the circle, square, and triangle marks by quadratic equations, respectively. From FIG. 8(b), it can be seen that the relationship between the focus balance value and the reproduced signal amplitude can be approximated by a quadratic equation in each case.

Figure 9A:
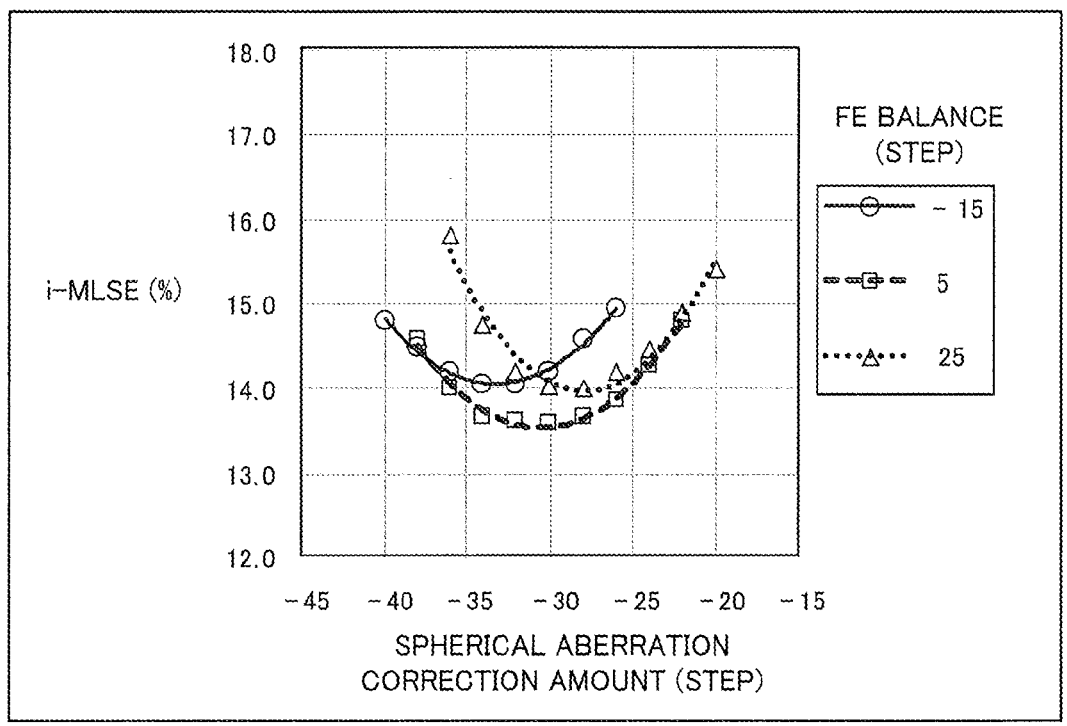
FIG. 9(a) is a graph showing an example of a relationship between the spherical aberration correction amount and the reproduced signal quality.

FIG. 9(a) is a graph showing relationships between the spherical aberration correction amount and the i-MLSE (reproduced signal quality). Among the relationship between the spherical aberration correction amount and focus balance value and the i-MLSE in FIG. 3, FIG. 9(a) shows the relationships between the spherical aberration correction amount and the i-MLSE at focus balance values of '−15', '5', and '25'. The focus balance value '5' is a focus balance value when the i-MLSE is near maximum; the focus balance values '−15' and '25' are focus balance values shifted from the focus balance value '5' by ±20 steps. The circle, square, and triangle marks in the graph represent the actual measurement values obtained in the measurement of the relationship of FIG. 3, and correspond to the cases of the focus balance values '−15', '5', and '25', respectively. The solid, dashed, and dotted lines are approximation curves obtained by approximating the actual measurement values of the circle, square, and triangle marks by quadratic equations, respectively. From FIG. 9(a), it can be seen that the relationship between the spherical aberration correction amount and the i-MLSE can be approximated by a quadratic equation in each case.

Figure 9B:
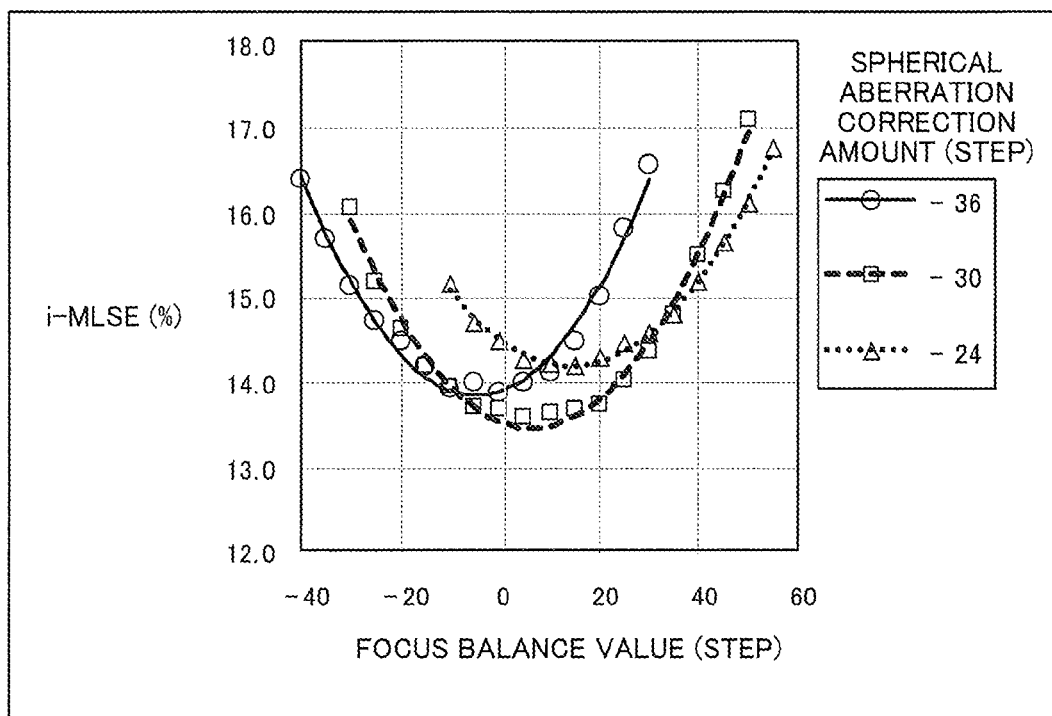
FIG. 9(b) is a graph showing an example of a relationship between the focus balance value and the reproduced signal quality.

FIG. 9(b) is a graph showing relationships between the focus balance value and the i-MLSE (reproduced signal quality). Among the relationship between the spherical aberration correction amount and focus balance value and the i-MLSE in FIG. 3, FIG. 9(b) shows the relationships between the focus balance value and the i-MLSE at spherical aberration correction amounts of '−36', '−30', and '−24'. The spherical aberration correction amount '30' is a spherical aberration correction amount when the i-MLSE is near maximum; the spherical aberration correction amounts '−36' and '−24' are spherical aberration correction amounts shifted from the spherical aberration correction amount '−30' by ±6 steps. The circle, square, and triangle marks in the graph represent the actual measurement values obtained in the measurement of the relationship in FIG. 3, and correspond to the cases of the spherical aberration correction amounts '−36', '−30', and '−24', respectively. The solid, dashed, and dotted lines are approximation curves obtained by approximating the actual measurement values of the circle, square, and triangle marks by quadratic equations, respectively. From FIG. 9(b), it can be seen that the relationship between the focus balance value and the i-MLSE can be approximated by a quadratic equation in each case.

The above description illustrates the actual measurement results regarding the second layer of the BD-RE. However, the same results are obtained regarding other layers or other types of discs although there is difference in the ellipse shape.

Hereinafter, the adjustment method of the spherical aberration correction amount and focus balance value in this embodiment will be described with reference to FIG. 10. FIG. 10 is obtained by adding measurement points, estimated points, an ellipse center, and the like in the adjustment method of this embodiment, to the distribution of the reproduced signal amplitude with respect to the spherical aberration correction amount and focus balance value in FIG. 4.

In FIG. 10, the circle marks represent the measurement points PM, at which the reproduced signal amplitudes are measured in the adjustment method. That is, for each of the measurement points PM, the adjustment method sets the spherical aberration correction amount and focus balance value to the values corresponding to the measurement point PM, reproduces signal recorded on the optical disc 500, and measures the reproduced signal amplitude.

The measurement points PM are arranged under the condition that at least three measurement points PM exist on each of at least three straight lines on a plane with coordinate axes representing the spherical aberration correction amount and focus adjustment value. In the example of FIG. 10, in an x-y coordinate system (x-y plane or two-dimensional plane) with the x-axis (horizontal axis) representing the spherical aberration correction amount and the y-axis (vertical axis) representing the focus balance value, three measurement points PM exist on each of three straight lines L1, L2, and L3, and a total of seven measurement points PM are arranged. Although FIG. 10 illustrates three straight lines, at least three straight lines are required, and the measurement points PM may be arranged on four or more straight lines. Further, although three measurement points are arranged on each straight line in FIG. 10, at least three measurement points are required per straight line, and four or more measurement points may be arranged on one straight line.

In the setting of the measurement points PM, from the viewpoint of ensuring the accuracy of the adjustment, it is desirable that the interval between each measurement point PM on each straight line is as wide as possible. This is because if the interval between measurement points PM is too narrow, the difference in measurement result between the measurement points PM becomes small, and the effect of noise or variation becomes considerable, resulting in poor accuracy of quadratic approximation, described later. On the other hand, if the interval between measurement points PM is too wide, the tracking servo is likely to become unstable. Thus, for example, from the distribution of the tracking error signal (TE signal) amplitude with respect to the spherical aberration correction amount and focus balance value shown in FIG. 6, the measurement points PM are set so that the interval between each measurement point PM is wide within a range in which the stability of the tracking servo can be ensured. In the example of FIG. 10, the measurement points PM are arranged without considering the above, and the interval between each measurement point PM is not very wide.

The measurement of the reproduced signal amplitude at each measurement point PM may be performed with the tracking servo being off, for example. In this case, for example, the reproduced signal amplitude may be calculated by detecting a maximum value (peak) and a minimum value (bottom) of the reproduced signal in one round of the disc. This makes it possible to perform the measurement without problems even if a measurement point PM (spherical aberration correction amount and focus balance value) is arranged in a region where the tracking servo becomes unstable.

It is desirable to set the measurement points PM so as to reduce the total amount of change and the total number of changes of the spherical aberration correction amount. This is because the spherical aberration correction lens 380 takes longer to move than the objective lens 350, and the change of the spherical aberration correction amount takes longer than the change of the focus position by changing the focus balance value. For example, the movement of the spherical aberration correction lens 380 by a stepping motor takes longer than the movement of the objective lens 350 by the actuator 390 of electromagnetic drive type with coils and magnetics. In FIG. 10, for example, the measurements at the respective measurement points PM are performed in the order indicated by the arrows.

In the example of FIG. 10, the straight line L1 is parallel to the x-axis, along which only the spherical aberration correction amount varies; the straight line L2 is parallel to the y-axis, along which only the focus balance value varies; the straight line L3 is substantially parallel to the direction of the long axis of the ellipse when the contour line is regarded as substantially an ellipse. The inclination of the ellipse of the contour line greatly varies depending on the optical specifications of the optical head 300. However, regarding optical heads 300 having the same specifications, the inclinations do not vary much, although they slightly vary depending on the individual variation of the optical head 300, temperature, and the optical disc 500 to be reproduced. Thus, by measuring characteristics as shown in FIG. 2 to obtain the inclination of the ellipse in advance, the inclination of the straight line L3 can be set to be close to the inclination of the actual ellipse.

Then, for each of the straight lines L1, L2, and L3, based on the measurement results at the respective measurement points PM on the straight line, the relationship between the position of the measurement point PM and the reproduced signal amplitude measured at the measurement point PM is quadratically approximated. Specifically, for each straight line, the position on the straight line is denoted as p, the reproduced signal amplitude is denoted as q, and a quadratic equation approximating the relationship between p and q is obtained from the measurement results. The quadratic approximation equation (equation of a quadratic approximation curve) for the straight line Li (i=1, 2, 3) is expressed as the following formula (1):

$$q = a_i \times p^2 + b_i \times p + c_i \quad (1).$$

In the above formula (1), ai, bi, and ci are constants. For example, for the straight line L1, the spherical aberration correction amount is used as p, and the coefficients a1, b1, and c1 in the quadratic approximation equation are obtained; for the straight line L2, the focus balance value is used as p, and the coefficients a2, b2, and c2 in the quadratic approximation equation are obtained; for the straight line L3, the spherical aberration correction amount (or focus balance value) is used as p, and the coefficients a3, b3, and c3 in the quadratic approximation equation are obtained.

Figure 11A:
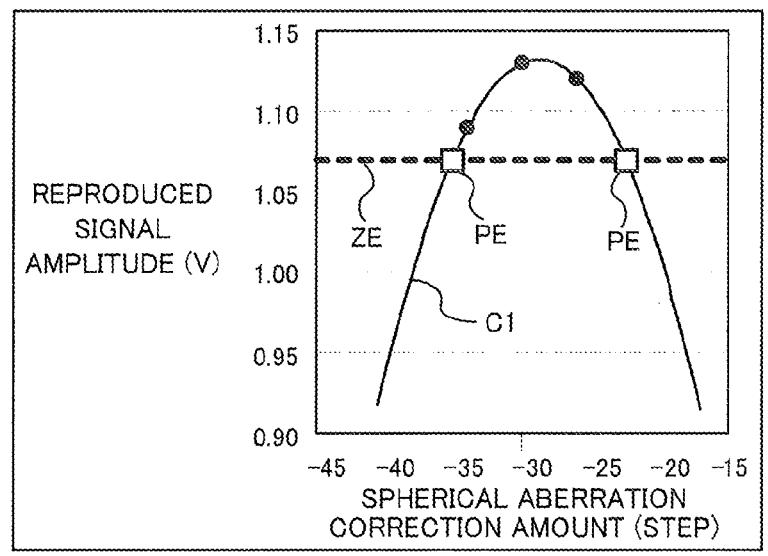
FIGS. 11(a) to 11(c) are graphs showing examples of quadratic approximate curves and estimated points.
Figure 11B:
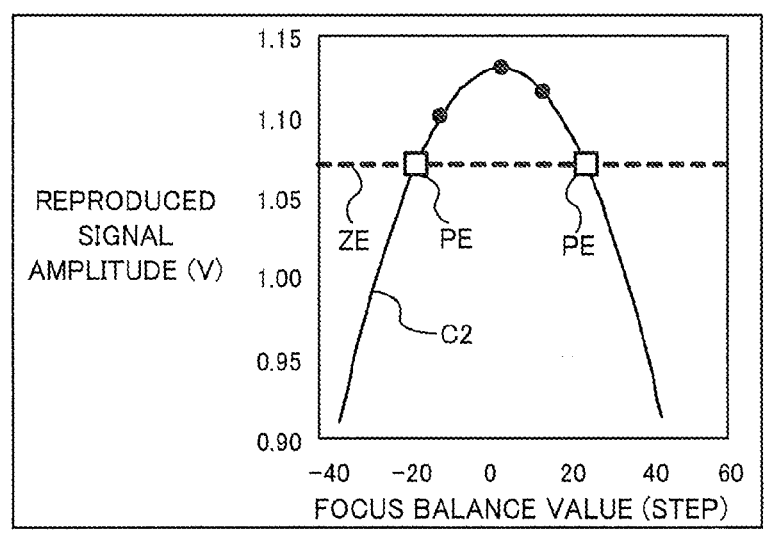
Figure 11C:
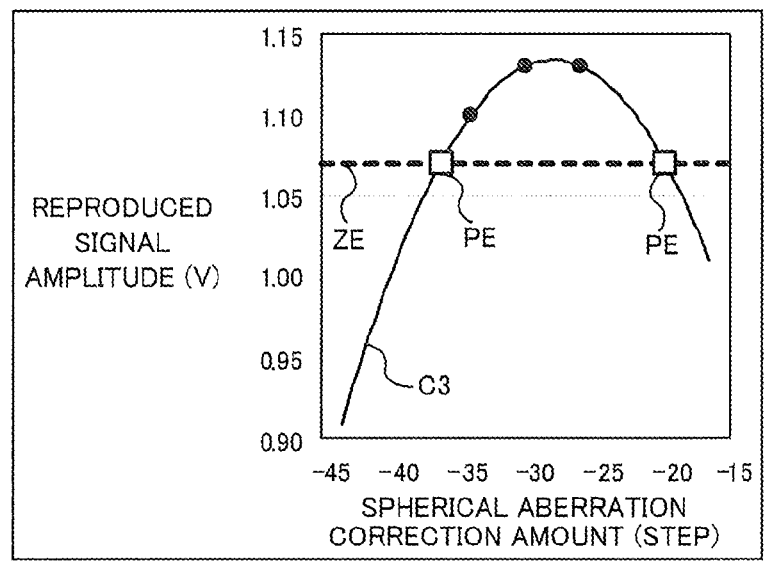

FIG. 11 shows quadratic approximation curves obtained by the above quadratic approximation. FIG. 11(a) shows a quadratic approximation curve C1 approximating the measurement results at the measurement points PM on the straight line L1; FIG. 11(b) shows a quadratic approximation curve C2 approximating the measurement results at the measurement points PM on the straight line L2; FIG. 11(c) shows a quadratic approximation curve C3 approximating the measurement results at the measurement points PM on the straight line L3. The circle marks in the graphs indicate the measurement points PM.

Then, for each of the straight lines L1, L2, and L3, from the quadratic approximation curve obtained by the quadratic approximation, one or more positions at which the reproduced signal amplitude has a predetermined estimation value (or level) ZE on the straight line are obtained as estimated points PE. That is, for each straight line, from the quadratic approximation equation obtained for the straight line, one or more values of the position p satisfying q=ZE, are obtained. For example, for the straight line L1 (i=1, 2, 3), the one or more positions p (estimated points PE) at which the reproduced signal amplitude is equal to the estimation value ZE can be obtained from the following formula (2) by using the coefficients ai, bi, and ci of the quadratic equation obtained by the quadratic approximation as the solutions of the quadratic equation:

$$q = \{-b_i \pm \sqrt{(b_i^2 - 4 \times a_i \times (c_i - ZE))}\} / (2 \times a_i) \quad (2).$$

For example, a total of six estimated points PE are obtained by obtaining the estimated points PE on each of the three straight lines L1, L2, and L3. FIGS. 10 and 11 show the estimated points PE when the estimation value ZE is 1.07 V with the square marks.

Then, on the x-y plane, an ellipse approximation is performed on the obtained six estimated points PE. FIG. 10 shows an ellipse DE derived from the ellipse approximation. This ellipse DE is an approximation ellipse corresponding to the contour line on which the reproduced signal amplitude is the predetermined estimation value ZE (e.g., 1.07 V).

An ellipse equation is expressed, for example, by the following formula (3) with the spherical aberration correction amount x and focus balance value y:

$$A \times x^2 + B \times x \times y + C \times y^2 + D \times x + E \times y + 1 = 0 \quad (3)$$

The equation of the ellipse DE can be derived by obtaining the coefficients A, B, C, D, and E in the above formula (3) from the obtained estimated points PE. The coefficients A, B, C, D, and E can be derived from at least five estimated points PE, and can be obtained, for example, by using five of the obtained six estimated points PE to solve the following five linear equations (4) to (8):

$$A \times x1^2 + B \times x1 \times y1 + C \times y1^2 + D \times x1 + E \times y1 = -1 \quad (4);$$

$$A \times x2^2 + B \times x2 \times y2 + C \times y2^2 + D \times x2 + E \times y2 = -1 \quad (5);$$

$$A \times x3^2 + B \times x3 \times y3 + C \times y3^2 + D \times x3 + E \times y3 = -1 \quad (6);$$

$$A \times x4^2 + B \times x4 \times y4 + C \times y4^2 + D \times x4 + E \times y4 = -1 \quad (7);$$

$$A \times x5^2 + B \times x5 \times y5 + C \times y5^2 + D \times x5 + E \times y5 = -1 \quad (8).$$

In the above equations (4) to (8), xn (n=1 to 5) is the x-coordinate value (spherical aberration correction amount) of each of the five estimated points PEn; yn (n=1 to 5) is the y-coordinate value (focus balance value) of each of the five estimated points PEn.

The above example derives the equation of the ellipse DE by using only five of the obtained six estimated points PE, but the equation of the ellipse DE may be derived using all of the six estimated points PE by, for example, the least squares method.

For example, when only five of the six estimated points PE are used, among the six estimated points PE, the estimated point having the smallest minimum value is omitted, the minimum value being the smallest of the sums of the distances from other two points. Here, the 'minimum value' means, for a certain estimated point PE, the sum of the distances from the two points closest to the certain estimated point PE among the estimated points PE other than the certain estimated point PE; 'the estimated point having the smallest minimum value' means the estimated point having the smallest sum of the distances. Another method may obtain an average value xave of the x-coordinate values (spherical aberration correction amounts) and an average value yave of the y-coordinate values (focus balance values) of the six estimated points PE, and omit the estimated point closest to the average value (xave, yave) of the estimated points PE among the six estimated points PE.

Then, a center PC of the ellipse DE is calculated from the derived equation (or ellipse coefficients) of the ellipse DE. FIG. 10 shows the center PC of the ellipse DE with the star mark. The ellipse center PC (xc, yc) can be obtained, for example, by solving the following linear equations (9) and (10):

$$2 \times A \times xc + B \times yc = -D \quad (9); \text{ and}$$

$$B \times xc + 2 \times C \times yc = -E \quad (10).$$

The ellipse center PC may be obtained by methods other than solving the above linear equations.

The obtained ellipse center PC corresponds to a position at which the reproduced signal amplitude is maximum, and is the result of the adjustment of the spherical aberration correction amount and focus balance value. For example, the coordinates of the ellipse center PC is set or used as the optimum spherical aberration correction amount and focus balance value.

Other examples of the arrangement of the measurement points PM will now be described. In the adjustment method of the spherical aberration correction amount and focus balance value in this first embodiment, the measurement points PM are set under the condition that three or more measurement points PM are arranged on each of different three or more straight lines on the x-y coordinate system (two-dimensional plane) having the x-coordinate representing the spherical aberration correction amount and the y-coordinate representing the focus balance value.

FIG. 12 shows six exemplary arrangements different from the exemplary arrangement of the measurement points PM in FIG. 10. In the exemplary arrangements in FIG. 12, three straight lines L1, L2, and L3 are arranged.

In FIG. 10, the three measurement points PM are arranged on each of the three straight lines L1, L2, and L3; the straight line L1 is parallel to the x-axis along which only the spherical aberration correction amount varies; the straight line L2 is parallel to the y-axis along which only the focus balance value varies; the straight line L3 is substantially parallel to the long axis direction of the ellipse when the contour line is regarded as substantially an ellipse; all the three straight lines pass through one of the measurement points PM; a total of seven measurement points PM are arranged.

Figure 12A:
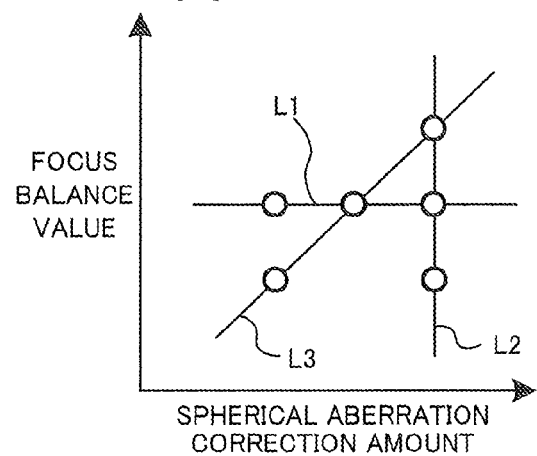
FIGS. 12(a) to 12(f) are diagrams showing exemplary arrangements of the measurement points in the first embodiment.

In FIG. 12(a), while three measurement points PM are arranged on each of the three straight lines L1, L2, and L3, the total number of measurement points PM is six, which is smaller than in FIG. 10. This makes it possible to reduce the number of measurements at the measurement points PM and the overall adjustment time, compared with the case of FIG. 10.

Figure 12D:
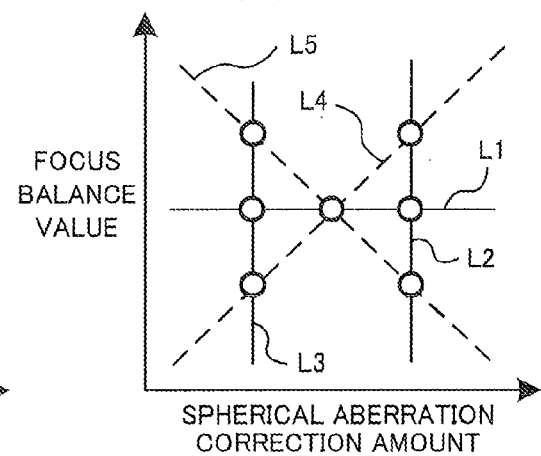
Figure 12B:
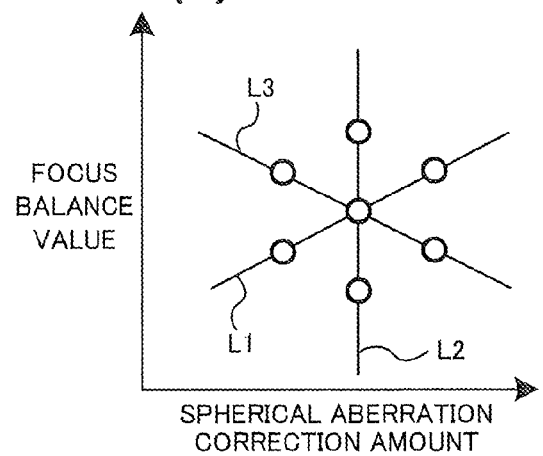

In FIG. 12(b), the straight line L2 is parallel to the y-axis, and the straight lines L1 and L3 are both inclined to the x- and y-axes. All of the straight lines intersect at one intersection, one measurement point PM is arranged at the intersection, and six measurement points PM are arranged symmetrically with respect to the measurement point PM at the intersection horizontally (in the x-axis direction) and vertically (in the y-axis direction). For example, depending on the specifications or the like of the optical head 300, when the contour line of the distribution of the reproduced signal amplitude or reproduced signal quality with respect to the spherical aberration correction amount and focus balance value is not inclined obliquely, and the long and short axes of the ellipse corresponding to the contour line are respectively parallel to the x- and y-axes, the arrangement of the measurement points PM as shown in FIG. 12(b) is considered to be desirable. An arrangement obtained by turning the arrangement of FIG. 12(b) by 90 degrees about the measurement point PM at the intersection (center) may be used. However, this arrangement requires at least five changes of the spherical aberration correction amount, and therefore requires a longer time for adjustment than the arrangement of FIG. 12(b) when the optical information processing apparatus 100 has a configuration in which it takes time to change the spherical aberration correction amount.

Figure 12E:
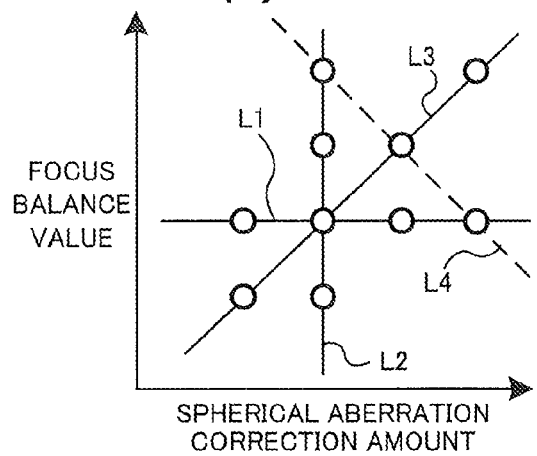
Figure 12C:
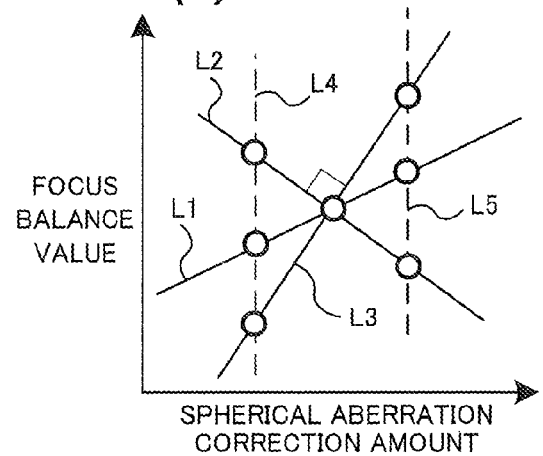

In FIG. 12(c), all of the three straight lines L1, L2, and L3 are inclined to the x- and y-axes, and the straight lines L2 and L3 are substantially perpendicular to each other. For example, the straight line L3 is parallel to the long axis of the ellipse shown in FIG. 10, and the straight line L2 is parallel to the short axis of the ellipse. The straight line L1 is inclined with respect to both the straight lines L2 and L3. The straight lines L1, L2, and L3 intersect at one intersection, and one measurement point PM is arranged at the intersection. On each of the three straight lines L1, L2, and L3, one measurement point PM is arranged on each side of the measurement point PM at the intersection. The x-coordinate value (spherical aberration correction amount) of the measurement point PM on each side is the same between the three straight lines. The y-coordinate value (focus balance value) of the measurement point PM on each side of the intersection on the straight line L1 is near the center between the measurement point PM on each side of the intersection on the straight line L2 and the measurement point PM on each side of the intersection on the straight line L3. Such an arrangement of the measurement points PM makes it possible to obtain estimated points PE in the directions of the long and short axes of the ellipse, and the accuracy of the ellipse equation obtained from the estimated points PE is thought to be improved.

Further, in FIG. 12(c), three measurement points PM are also arranged on each of straight lines L4 and L5 indicated by dashed lines. By performing quadratic approximation to obtain estimated points PE on the straight lines L4 and L5, at most ten estimated points PE including the estimated points PE on the straight lines L1, L2, and L3 are obtained. By obtaining the ellipse equation from these ten estimated points PE, the accuracy of the obtained ellipse is improved.

In FIG. 12(d), all of the three straight lines L1, L2, and L3 are parallel to the x- or y-axis. As in FIG. 12(c), estimated points PE can be obtained on the straight lines L4 and L5.

FIG. 12(e) shows an example in which four measurement points PM are arranged on each of the three straight lines L1, L2, and L3. In this case, for each of the straight lines, it is possible to perform a quadratic approximation using the positions of the four measurement points PM and the measurement results thereof by means of, for example, the least squares method and obtain estimated points PE. This makes it possible to improve the accuracy of the quadratic approximations, and improve the accuracy of the estimated points PE obtained from the results of the quadratic approximations and the accuracy of the ellipse derived from the estimated points PE.

In FIG. 12(e), an additional quadratic approximation may be performed on the straight line L4, as in FIGS. 12(c) and 12(d). Instead of arranging four measurement points PM on each of the three straight lines, it is possible to arrange four measurement points PM on only one or two of the three straight lines. It is effective to increase the number of measurement points PM on a straight line on which the error of the quadratic approximation is likely to occur; for example, four or more measurement points PM are arranged on the straight line L3, which is parallel to the long axis direction of the ellipse.

Figure 12F:
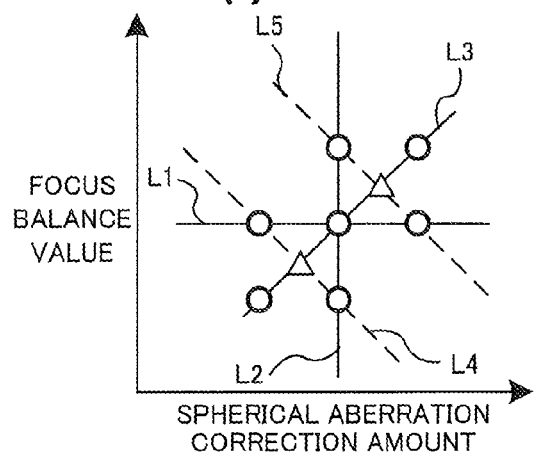

In FIG. 12(f), the arrangement of the measurement points PM is the same as that in FIG. 10. In this example, straight lines L4 and L5 each passing through a measurement point PM on the straight line L1 and a measurement point PM on the straight line L2 are further set. The reproduced signal amplitudes at the intersection (triangle mark in the diagram) of the straight lines L4 and L3 and at the intersection (triangle mark in the diagram) of the straight lines L5 and L3 are derived, as virtual measurement results, from the result of the quadratic approximation on the straight line L3. The intersections will be referred to below as the 'measurement points PM2'. On each of the straight lines L4 and L5, there are three measurement points including two measurement points PM and one measurement point PM2, and additional estimated points PE can be obtained by quadratic approximation. Thereby, the ellipse equation can be obtained from more estimated points PE than the six estimated points PE on the straight lines L1, L2, and L3. Thus, compared with the case of FIG. 10, since the number of estimated points PE can be increased without increasing the number of measurement points PM, the accuracy of the ellipse equation derived from the estimated points PE can be improved without increasing the time required for the measurements.

FIGS. 10 and 12 illustrate exemplary arrangements of the measurement points PM; the measurement points PM may be arranged in other patterns, as long as at least three measurement points PM are arranged on each of at least three straight lines. When a measurement point PM2 is obtained from the quadratic approximation result on a straight line as in FIG. 12(f), an arrangement is possible in which at least three measurement points, each of which may be a measurement point PM or PM2, are arranged on each of three or more straight lines including a straight line passing through a measurement point PM2. That is, the measurement point PM2 may be used as the measurement point PM.

The arrangement of the measurement points PM may be set, for example, in accordance with the distribution (shape or inclination of the ellipse) of the reproduced signal amplitude or the reproduced signal quality with respect to the spherical aberration correction amount and focus balance value, which varies depending on the specifications of the optical head 300 or the like; the same arrangement of the measurement points PM may be used for optical heads 300 having the same specifications.

Figure 13:
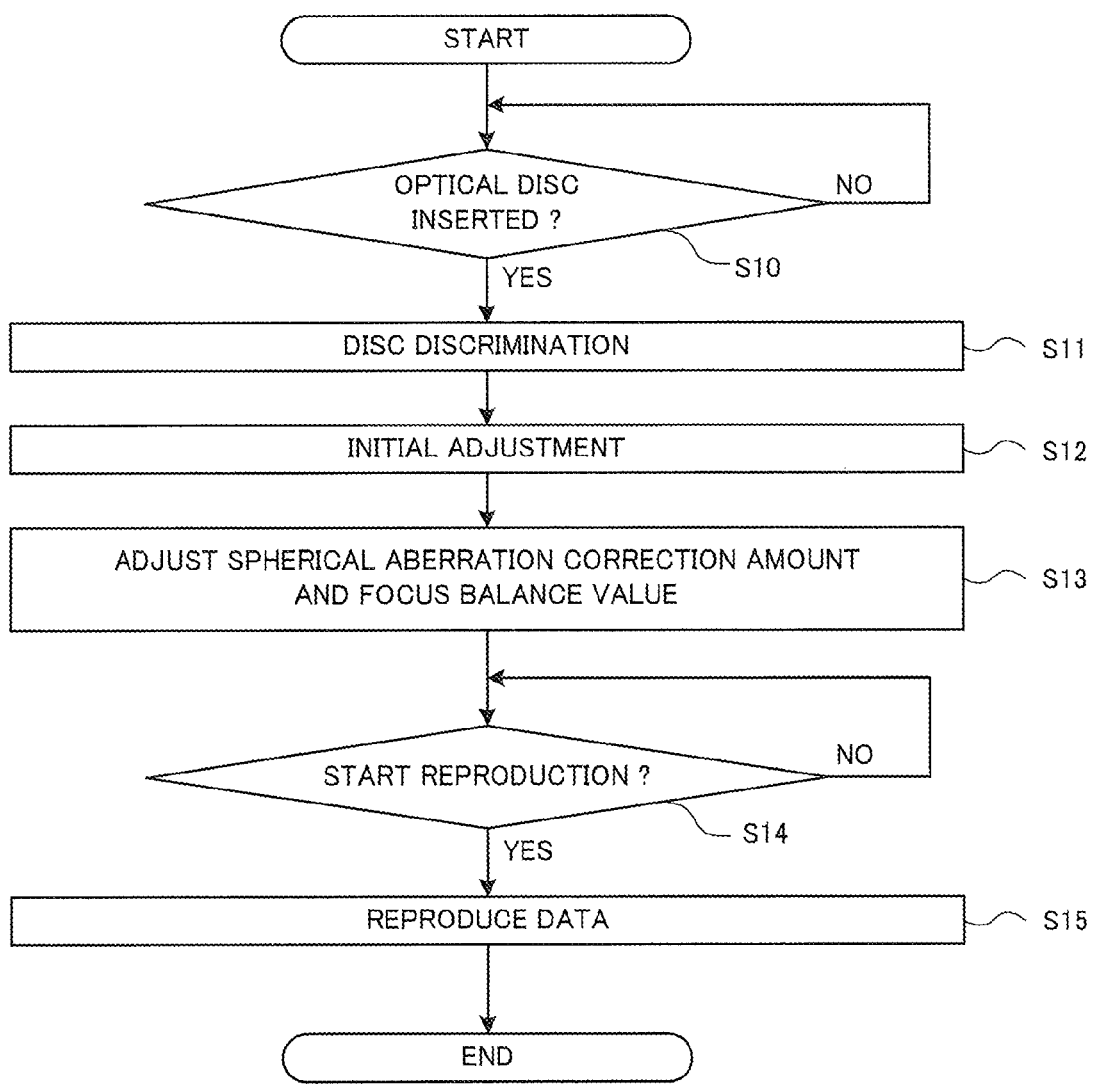
FIG. 13 is a flowchart showing an exemplary procedure of the reproduction operation of the optical information processing apparatus in the first embodiment.

FIG. 13 is a flowchart showing an exemplary procedure of the reproduction operation of the optical information processing apparatus 100 in this embodiment. The procedure of the reproduction operation of the optical information processing apparatus 100 will be described below with reference to FIG. 13.

First, when an optical disc 500 is inserted into the optical information processing apparatus 100, a sensor (not shown) detects it (step S10) and notifies the central control unit 200, which drives the optical head 300 via the actuator control unit 170 or the like and determines the type (CD, DVD, or BD etc.) of the optical disc 500 inserted into the optical information processing apparatus 100, how many layers the optical disc 500 has, and the like (step S11).

Next, in step S12, the central control unit 200 performs initial adjustments including rough adjustments of a tilt angle against the optical disc 500, gain settings for various signals, servo conditions, and the like, and then in step S13, adjusts the spherical aberration correction amount and focus balance value. The process in step S13 will be detailed later.

Next, the central control unit 200 reads, from the optical disc 500, specific information of the optical disc, control information for controlling the reproduction operation, and other information, and determines whether to start reproduction (step S14), starting the reproduction (main reproduction) of intended data from the optical disc 500 in step S15.

Figure 14:
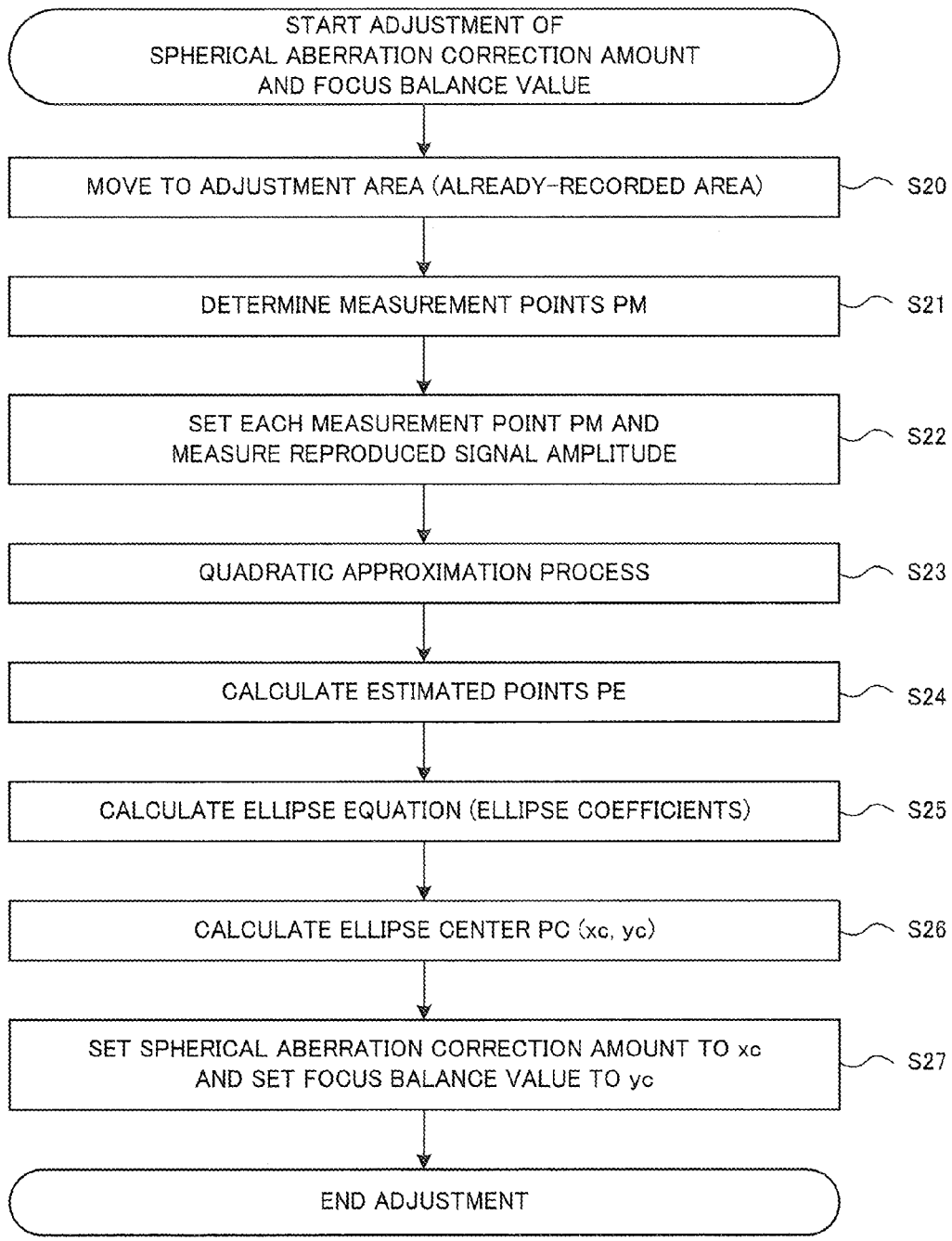
FIG. 14 is a flowchart showing an exemplary procedure of the adjustment of the spherical aberration correction amount and focus balance value in the optical information processing apparatus in the first embodiment.

FIG. 14 is a flowchart showing the process in step S13 in FIG. 13. The adjustment (or determination of the combination) of the spherical aberration correction amount and focus balance value in step S13 will be described below with reference to FIG. 14.

First, in step S20, the central control unit 200 controls the sled motor 151 via the sled motor control unit 150 to move the optical head 300 to an adjustment area for adjusting the spherical aberration correction amount and focus balance value, thereby allowing signals in the adjustment area in the optical disc 500 to be reproduced.

The adjustment area is an already-recorded area in which signals are already recorded on the optical disc 500, and includes, for example, a data area in which reproduction data are recorded, a disc management area (generally located at an inner circumference of the optical disc 500) in which the specific information, such as an ID, of the optical disc 500 is recorded, and a recording management area (generally located at an inner circumference of the optical disc 500) for managing addresses in the optical disc 500 at which data are recorded or the like.

When the optical disc 500 has multiple information recording layers, each of the information recording layers requires the adjustment of the spherical aberration correction amount and focus balance value, which requires reproducing the information recording layer for which the adjustment is to be performed.

Next, in step S21, the central control unit 200 determines measurement points PM. In the determination of the measurement points PM, it may set a reference point and determine the measurement points PM by using combinations of differences of the spherical aberration correction amount and focus balance value from the reference point, or may determine in advance the combinations of the spherical aberration correction amount and focus balance value for all of the measurement points PM. For example, when determining the measurement points PM after setting the reference point, a spherical aberration correction amount and a focus balance value are stored in advance for each type of optical disc 500 and for each recording layer in the ROM 220, RAM 230, or the like, and the central control unit 200 reads, from among the stored spherical aberration correction amounts and focus balance values, the values corresponding to the optical disc 500 and recording layer for which the adjustment is to be performed, setting the values as the reference point. Then, it reads, from the ROM 220 or RAM 230, data required for determining the measurement points PM, such as data of the differences from the reference point, and determines all the measurement points PM. If the spherical aberration correction amount and focus balance value are roughly adjusted in the rough adjustments of the servo conditions or the like in step S12, the adjustment results may be set as the reference point. It is not necessary to determine all the measurement points PM in step S21; the position of the next measurement point PM may be determined based on the measurement results in the following step S22, for example.

Next, in step S22, the central control unit 200 measures the reproduced signal amplitude at each of the measurement points PM determined in step S21. Specifically, the central control unit 200 sets the spherical aberration correction amount and focus balance value to the values corresponding to the first measurement point PM and measures the reproduced signal amplitude. Then, it sets the spherical aberration correction amount and focus balance value to the values corresponding to the second and subsequent measurement points PM in a measurement order, and measures the reproduced signal amplitude at each of the measurement points PM in order, obtaining a measurement result at each of the measurement points PM. That is, in accordance with a predetermined measurement order, for each of the measurement points PM, the central control unit 200 reproduces the optical disc 500 using the spherical aberration correction amount and focus balance value corresponding to the measurement point PM to measure the reproduced signal amplitude.

Next, in step S23, the central control unit 200 performs the quadratic approximation process on the measurement results at the respective measurement points PM in step S22 along the three or more straight lines (here, three straight lines L1, L2, and L3) each passing through at least three measurement points PM, obtaining quadratic approximation equations (or coefficients of quadratic equations).

Next, in step S24, for each of the straight lines L1, L2, and L3, the central control unit 200 calculates, from the coefficients of the quadratic equation obtained in step S23, positions at which the reproduced signal amplitude has the estimation value ZE, as the estimated points PE.

The estimation value ZE need not necessarily be a predetermined value; it may be calculated and set from the measurement results of the reproduced signal amplitude at the measurement points PM, for example. In this case, for example, the maximum value of the quadratic approximation curve is obtained from the quadratic equation coefficients obtained in step S23 for each of the straight lines L1, L2, and L3, and the estimation value ZE is set to a value smaller than the smallest of the obtained three maximum values. Alternatively, the estimation value ZE may be set to a value smaller than the smallest of the measurement results at the measurement points PM.

Instead of using only one estimation value ZE, it is possible to set different multiple estimation values ZE, obtain estimated points PE at the respective estimation values ZE, and obtain ellipse centers PC at the respective estimation values ZE from the obtained estimated points PE.

Next, in step S25, the central control unit 200 calculates the ellipse equation (or ellipse coefficients constituting the ellipse equation) from the estimated points PE obtained in step S24, and then in step S26, calculates an ellipse center PC (xc, yc) from the ellipse equation (or ellipse coefficients) obtained in step S25.

Next, in step S27, the central control unit 200 sets the spherical aberration correction amount and focus balance value to the ellipse center PC obtained in step S26. That is, it sets the spherical aberration correction amount to xc and the focus balance value to yc, completing the adjustment of the spherical aberration correction amount and focus balance value in step S13.

The following advantages (1) to (7) can be obtained from this embodiment described above.

(1) In this embodiment, the optical information processing apparatus measures a signal characteristic of the reproduced signal at each of at least three measurement positions on each of at least three straight lines on a plane having coordinate axes representing the spherical aberration correction amount and focus adjustment value (e.g., focus balance value), obtains, from the results of the measurements, as estimated positions, at least five positions on the plane at which the signal characteristic has substantially the same value (or level), and adjusts the spherical aberration correction amount and focus adjustment value based on the at least five estimated positions. Thus, this embodiment makes it possible to adjust the spherical aberration correction amount and focus adjustment value by measurements at at least six measurement positions, that is, with a small number of measurement points. Therefore, for example, the spherical aberration correction amount and focus position can be adjusted in a short time.

(2) The optical information processing apparatus obtains a center of an ellipse obtained by performing an ellipse approximation on the above at least five estimated positions, and adjusts the spherical aberration correction amount and focus position based on the center of the ellipse. This makes it possible to obtain a position at which the signal characteristic of the reproduced signal is maximum or near maximum on the plane with the spherical aberration correction amount and focus adjustment value as coordinate axes, and accurately perform the adjustment based on the position. Specifically, it is possible to obtain, as an ellipse center, a center of a contour line (distribution) on which the signal characteristic has substantially the same value, and set the spherical aberration correction amount and focus adjustment value to optimum or near optimum values based on the ellipse center. Also, based on the fact that a contour line of the signal characteristic with respect to the spherical aberration correction amount and focus balance value is substantially an ellipse, the ellipse is estimated, and the center of the ellipse is obtained. This enables adjustment with a margin ensured.

(3) The optical information processing apparatus obtains, for each of the straight lines, one or more positions on the plane at which the signal characteristic has a predetermined value, as the estimated positions, from an approximation result obtained by approximating a relationship between the measurement position and the signal characteristic measured at the measurement position by a second or higher order polynomial, and obtains a center of the ellipse by using at least five of the obtained estimated positions. This makes it possible to obtain the estimated positions accurately, and obtain the center of the ellipse with high accuracy.

(4) The optical information processing apparatus uses an amplitude of the reproduced signal as the signal characteristic of the reproduced signal. According to this aspect, the adjustment time can be reduced as compared with the case where a quality of the reproduced signal is used.

(5) The optical information processing apparatus uses a quality of the reproduced signal as the signal characteristic of the reproduced signal. According to this aspect, the adjustment can be made so as to provide a good reproduced signal quality as compared with the case where an amplitude of the reproduced signal is used.

(6) The arrangement of the measurement positions and the measurement order are set so as to reduce the number of changes and amount of change of the spherical aberration correction amount. This makes it possible to reduce the change of the spherical aberration correction amount, which takes time, and perform the adjustment in a short time.

(7) One of the at least three straight lines is substantially parallel to a long axis direction of the ellipse when a contour line of the signal characteristic is regarded as an ellipse. According to this aspect, the approximation ellipse can be obtained accurately. For example, in the estimation of the ellipse, a large error may occur in the long axis direction. This error can be reduced by performing the measurements at positions along the long axis direction, according to the present aspect.

The above description illustrates a method in which the adjustment is performed by measuring the reproduced signal amplitude, but the adjustment may be performed by measuring the reproduced signal quality in the same way. In this case, conditions for obtaining the estimated points PE need to be defined by the magnitude of the reproduced signal quality in place of the reproduced signal amplitude. When an index (e.g., i-MLSE) that becomes smaller as the reproduction quality becomes higher is used as the reproduced signal quality, it is desirable that the estimation value is set to be larger than the largest of the measurement results at the respective measurement points PM. When the adjustment is performed by measuring the reproduced signal quality, since it takes time to measure the reproduced signal quality, the entire adjustment time becomes longer, but the reproduced signal quality becomes higher, as compared with the case of measuring the reproduced signal amplitude. This is because the distribution of the reproduced signal amplitude differs slightly from that of the reproduced signal quality (see FIG. 7).

It is also possible to measure the reproduced signal amplitude to obtain the ellipse center PC, set again the measurement points PM with the ellipse center PC as the reference point (or set again the measurement points PM near the ellipse center PC), and measure the reproduced signal qualities at the measurement points PM to obtain the ellipse center PC again. The reason for doing so is that, when the measurement points PM are far away from the ellipse center PC, it may be impossible to measure the reproduced signal quality properly, or the value of the reproduced signal quality may be saturated. By obtaining the ellipse center PC based on the reproduced signal amplitudes once, setting again the measurement points PM based on the ellipse center PC, and measuring the reproduced signal qualities at the measurement points PM, appropriate measurement results of the reproduced signal qualities are obtained, and the ellipse center PC can be obtained accurately.

When the ellipse center PC is obtained by measuring the reproduced signal amplitudes, it is also possible to obtain in advance the differences of the spherical aberration correction amount and focus balance value between the ellipse centers of the reproduced signal amplitude and the reproduced signal quality as shown in FIG. 7, and correct the position of the ellipse center PC of the reproduced signal amplitude obtained from the measurement results by adding the differences to the ellipse center PC. The above differences need to be set in consideration of individual variation of the optical information processing apparatus 100 or the optical disc 500 regarding the positional relationship between the ellipse centers of the reproduced signal amplitude and the reproduced signal quality, or the like.

Although the above description illustrates a case where the ellipse of the contour line is inclined with respect to the x- and y-axes, depending on the optical specifications of the optical head 300, the ellipse of the contour line may have no or small inclination. In this case, although the ellipse center PC can be obtained in the same way, it is desirable that the arrangement of the measurement points PM or the like is set so that the ellipse can be estimated appropriately, for example.

The above description mainly illustrates a case where the quadratic approximation is performed using three measurement points PM, but the quadratic approximation may be performed using four or more measurement points PM in order to improve the accuracy of the adjustment. Thus, four or more measurement points PM may be arranged on each of the three straight lines. It is not necessary that the same number of measurement points PM are arranged on each of the three straight lines; for example, it is possible to increase the number of measurement points PM on the straight lines, giving priority to a direction (e.g., direction of the straight line L3 in FIG. 10) in which the variation of the reproduced signal amplitude is small.

When four or more measurement points PM are arranged on each of the straight lines, a third or higher order polynomial approximation may be performed instead of the quadratic approximation. However, the number of measurement points PM needs to be equal to or larger than the order of the polynomial approximation. With a configuration in which such a polynomial approximation is performed, even when the actual characteristic is asymmetric, such as when the approximation is performed at a location away from the ellipse center on a straight line obliquely crossing the long and short axes of the ellipse, the approximation can be performed properly and the estimated points PE for obtaining the ellipse equation can be obtained accurately.

The above description illustrates a case where the obtained ellipse center PC is set as the optimum spherical aberration correction amount and focus balance value, but it is also possible to optimally adjust the spherical aberration correction amount and focus balance value while further measuring the reproduced signal amplitudes or reproduced signal qualities near the obtained ellipse center PC, improving the adjustment accuracy.

The above description illustrates a configuration that obtains the ellipse equation from at least five estimated positions and calculates the center of the ellipse from the ellipse equation, but the optical information processing apparatus may perform the adjustment based on the at least five estimated positions in other ways. For example, the optical information processing apparatus may store in advance a table in which combinations of five estimated positions are associated with optimum combinations of the spherical aberration correction amount and focus balance value, and determine, with reference to the table, the optimum combination of the spherical aberration correction amount and focus balance value from the combination of the five estimated positions.

The above description illustrates a case where the optical information processing apparatus 100 is an optical reproducing apparatus, but the optical information processing apparatus 100 may be an apparatus (optical recording apparatus) for recording onto the optical disc 500. In this case, the optical information processing apparatus 100 includes, in addition to the configuration shown in FIG. 1, control units required for recording onto the optical disc 500, such as a data encoder for encoding user data from a host controller into data to be recorded on the optical disc 500, and a control unit regarding write strategy control for controlling the emission of a laser during recording onto the optical disc 500.

When the spherical aberration correction amount and focus balance value are adjusted in the optical recording apparatus, the adjustment is performed by reproducing an already-recorded area in which signals are recorded on the optical disc 500. If the optical disc 500, such as a blank disc, has no already-recorded area, an already-recorded area may be created by, for example, performing test writing or another writing in a test recording area for adjusting the laser power or another area, and the spherical aberration correction amount and focus balance value may be adjusted by using the created already-recorded area.

The adjustment method in this embodiment may be used in a rough adjustment performed in an initial adjustment. In particular, when the optical information processing apparatus 100 is an optical recording apparatus and the optical disc 500 is a disc, such as a blank disc, having no already-recorded area, the spherical aberration correction amount and focus balance value may be adjusted in a rough adjustment so that the amplitude of the tracking error signal is made maximum. Also, when the optical information processing apparatus 100 is an optical reproducing apparatus, the spherical aberration correction amount and focus balance value may be adjusted so that the amplitude of the tracking error signal is made maximum, for stable operation of the tracking servo. When a contour line (or distribution) of the amplitude of the tracking error signal is similar to that of the amplitude of the reproduced signal, the optical information processing apparatus 100 may adjust the spherical aberration correction amount and focus balance value using the amplitude of the tracking error signal as the signal characteristic of the reproduced signal. For example, in step S22 in FIG. 14, the amplitudes of the tracking error signals may be measured instead of the reproduced signal amplitudes, and the respective processes in steps S23 to S27 may be performed using the measurement results of the amplitudes of the tracking error signals.

In the example of FIG. 10, a relationship between the spherical aberration correction amount and focus balance value and the signal characteristic of the reproduced signal is measured and the inclination of the ellipse is obtained in advance, and the straight line L3 is set to have an inclination close to that of the ellipse. However, the inclination of the ellipse may vary depending on the reflectivity of the optical disc 500. For example, in a configuration that appropriately changes an output gain setting of the photodetector 370 or a gain setting of the head amplifier 110 in accordance with the reflectivity of the optical disc 500, the relationship between the spherical aberration correction amount and focus balance value and the signal characteristic of the reproduced signal may vary depending on the reflectivity of the optical disc 500, and the inclination of the ellipse may vary. Thus, the optical information processing apparatus 100 may store in advance correspondence information indicating a correspondence between the reflectivity of the optical disc 500 and the inclination of the ellipse; then, in the adjustment, it may obtain reflectivity information indicating the reflectivity of the optical disc 500 to be adjusted, specify the inclination of the ellipse corresponding to the reflectivity of the optical disc 500 to be adjusted based on the reflectivity information and correspondence information, and set the straight line L3 to have the specified inclination. Specifically, the optical information processing apparatus 100 may store the inclination of the ellipse for each type or reflectivity of the optical disc 500, or for each gain setting of the photodetector 370 or head amplifier 110; then, in the adjustment, it may obtain the type or reflectivity of the optical disc 500 to be adjusted, or gain setting of the photodetector 370 or the like, obtain the inclination of the ellipse corresponding to the type or the like of the optical disc 500 to be adjusted using the stored information, and set the obtained inclination as the inclination of the straight line L3. The correspondence information is obtained, for example, by measuring the inclinations of the ellipses for plural optical discs having different reflectivities.

Second Embodiment

The optical information processing apparatus in the second embodiment will be described below. The optical information processing apparatus in the second embodiment differs from the optical information processing apparatus in the first embodiment in regard to the adjustment process but otherwise is the same. Descriptions of parts that are the same as in the first embodiment will be omitted or simplified in the description below, and the same reference characters will be used for elements that are the same as or correspond to those in the first embodiment.

The central control unit 200 determines the validity of the measurements of the signal characteristics; if it is determined that the measurements are invalid, it measures the signal characteristic at an additional measurement position, and adjusts the spherical aberration correction amount and focus adjustment value from the measurement results including the signal characteristic measured at the additional measurement position.

In this example, the central control unit 200 determines, from a relationship between the obtained ellipse center and the measurement positions used in the derivation of the ellipse center, whether the ellipse center is valid, and if the ellipse center is invalid, determines that the measurements are invalid. Specifically, when the ellipse center is away from the measurement positions more than a predetermined standard, the central control unit 200 determines that the ellipse center is invalid. More specifically, when the ellipse center is not within a predetermined range defined by the measurement positions, the central control unit 200 determines that the ellipse center is invalid. For example, when the x-coordinate value of the ellipse center is within a range (between the smallest and the largest) of the x-coordinate values of the measurement points PM and the y-coordinate value of the ellipse center is within a range (between the smallest and the largest) of the y-coordinate values of the measurement points PM, the central control unit 200 determines that it is valid; otherwise, it determines that it is invalid. Alternatively, for example, if the ellipse center is in an area of a figure (e.g., hexagon in FIG. 10) obtained by connecting the measurement points PM with straight lines, the central control unit 200 determines that it is valid; otherwise, it determines that it is invalid. The predetermined standard and predetermined range are not limited to the above examples; they may be set appropriately.

Figure 15:
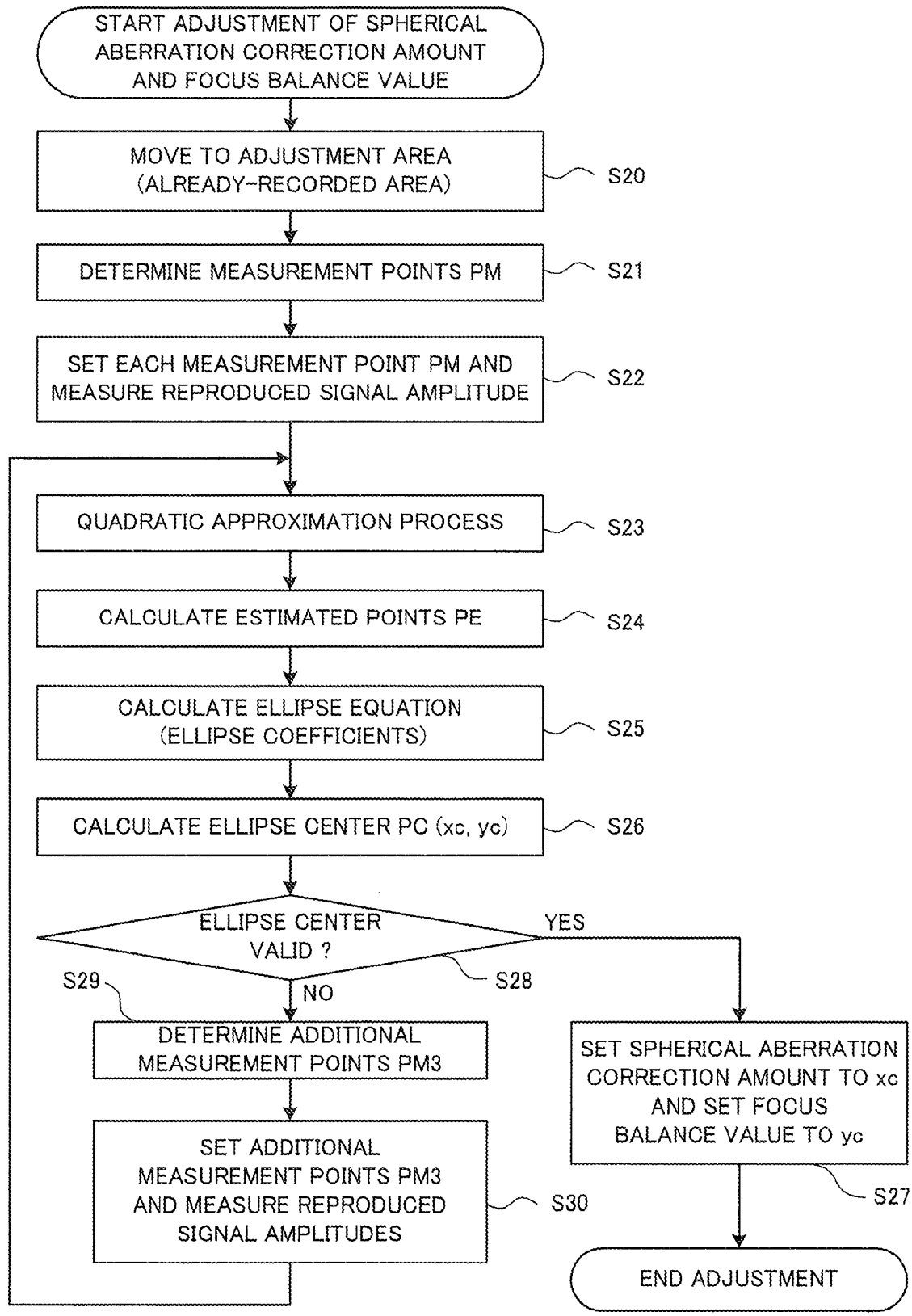
FIG. 15 is a flowchart showing an exemplary procedure of the adjustment of the spherical aberration correction amount and focus balance value in an optical information processing apparatus in a second embodiment.

FIG. 15 is a flowchart showing the adjustment process in the second embodiment. The adjustment process of FIG. 15 is performed in step S13 in FIG. 13 instead of the adjustment process of FIG. 14, for example. The adjustment of the spherical aberration correction amount and focus balance value in this embodiment will be described below with reference to FIG. 15.

In FIG. 15, the process until the ellipse center PC is calculated (i.e., the process from step S20 to step S26) is generally the same as in FIG. 14, and the central control unit 200 calculates the ellipse center PC, as in the first embodiment (steps S20 to S26).

After the calculation of the ellipse center PC, in step S28, the central control unit 200 determines, based on a positional relationship between the ellipse center PC calculated in step S26 and the measurement points PM determined in step S21, the validity (YES/NO) of the calculated ellipse center PC. For example, if the ellipse center PC is within a predetermined range defined by the measurement points PM, the central control unit 200 determines YES (valid); if the ellipse center PC is not within the predetermined range, it determines NO (invalid).

If the YES/NO determination in step S28 is YES, the central control unit 200 sets the spherical aberration correction amount and focus balance value to the ellipse center PC obtained in step S26 (step S27), and ends the adjustment of the spherical aberration correction amount and focus balance value.

On the other hand, if the YES/NO determination in step S28 is NO, the central control unit 200 advances the processing to step S29.

In step S29, the central control unit 200 determines additional measurement points PM3 as extra measurement points different from the existing measurement points. For example, on each of the straight lines L1, L2, and L3 in the determination of the measurement points PM in step S21, it sets an additional measurement point PM3 at a position closer to the ellipse center PC calculated in step S26 than the existing measurement points.

Figure 16:
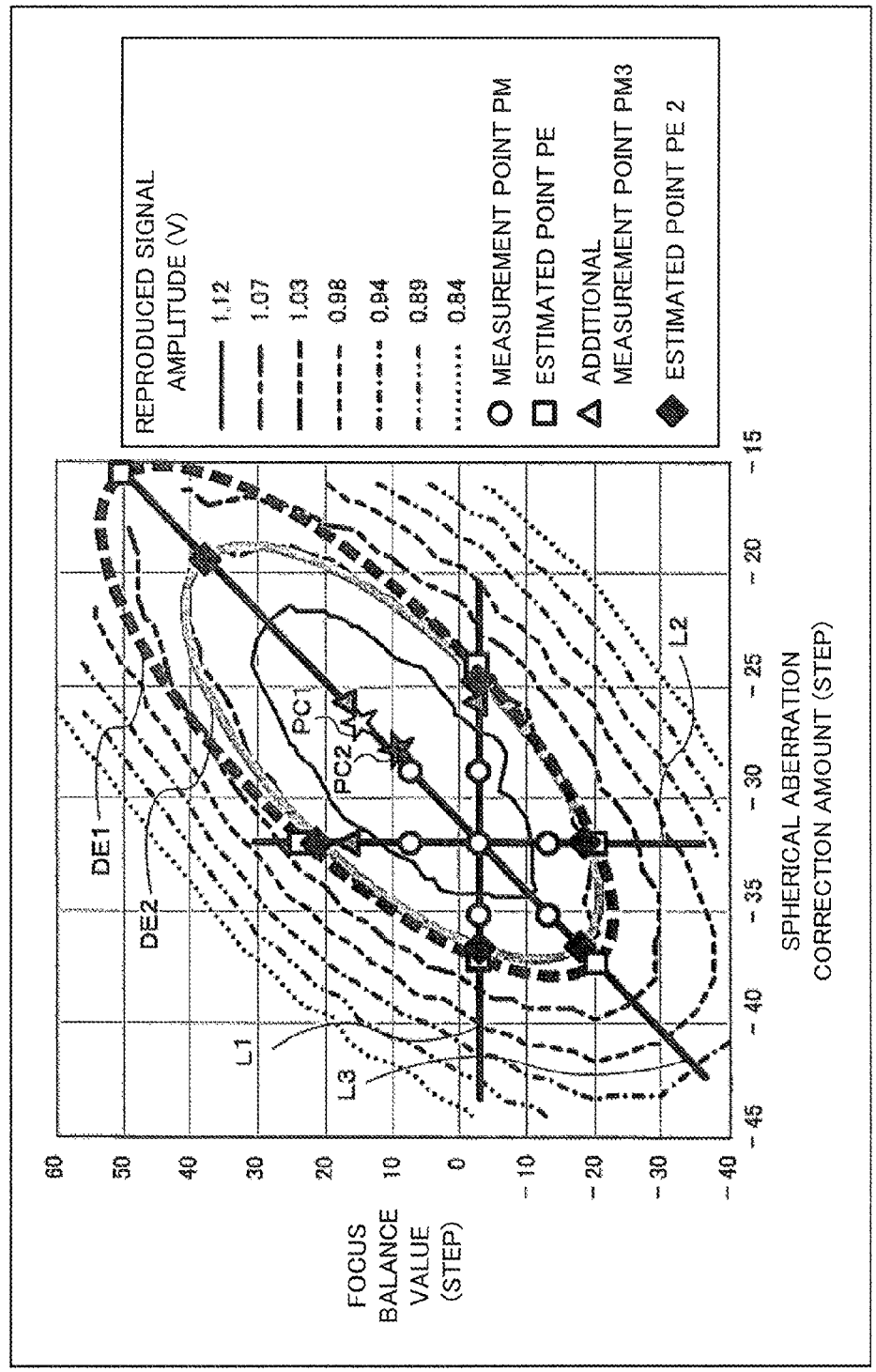
FIG. 16 is a diagram showing the distribution of the reproduced signal amplitude with respect to the spherical aberration correction amount and focus balance value, and an example of measurement points, estimated points, an ellipse, and an ellipse center in the second embodiment.

The determination of the additional measurement points PM3 will be described below with reference to FIG. 16. FIG. 16 is generally the same as FIG. 10 and shows the contour lines of the reproduced signal amplitude and straight lines L1, L2, and L3. FIG. 16 further shows measurement points PM (circle marks) determined in step S21, estimated points PE (white square marks) calculated in step S24, an ellipse DE1 obtained by the approximation in step S25, and an ellipse center PC1 calculated in step S26. In the example of FIG. 16, the measurement points PM are set at positions shifted from those in FIG. 10 in the minus directions of both the spherical aberration correction amount and focus balance value; the obtained ellipse DE1 is larger than the actual one due to the error in the quadratic approximation in step S23;

the position of the obtained ellipse center PC1 is displaced from the actual position. This is thought to be because when the measurement points PM are away from the actual ellipse center, which is near the point PC2 in FIG. 16, (e.g., when a range of the measurement points PM does not include the actual ellipse center), for example, a range of the measurement points PM on the straight line L3 does not include a point at which the reproduced signal amplitude is maximum on the straight line L3, and an error (i.e., approximation error) between the quadratic approximation curve and the actual characteristic of the reproduced signal amplitude tends to become large.

Thus, when the ellipse center PC1 calculated in step S26 is not within the range of the measurement points PM, it is highly likely that the ellipse center PC1 calculated in step S26 is displaced from the actual ellipse center (optimum values to which the spherical aberration correction amount and focus balance value should be adjusted).

Therefore, in this embodiment, if the relationship between the measurement points PM and the ellipse center PC is determined to be NO in step S28, the additional measurement points PM3 are set in step S29 so that the displacement can be corrected.

FIG. 16 shows an example of the additional measurement points PM3 with the triangle marks. In the example of FIG. 16, one additional measurement point PM3 is set on each of the existing straight lines L1, L2, and L3; on each of the straight lines, the additional measurement point PM3 is set at a position closer to the ellipse center PC1 calculated in step S26 than the existing measurement points PM (i.e., position shifted from the existing measurement points PM in a direction approaching the ellipse center PC1).

After the determination of the additional measurement points PM3, in step S30, the central control unit 200 measures the reproduced signal amplitude at each of the determined additional measurement points PM3. That is, for each of the additional measurement points PM3, it sets the spherical aberration correction amount and focus balance value to the values corresponding to the additional measurement point PM and measures the reproduced signal amplitude.

Next, the central control unit 200 returns to step S23 to perform the quadratic approximation process. This quadratic approximation process is performed by using the measurement results at the additional measurement points PM3 in step S30 in addition to the existing measurement results at the measurement points PM, so that the results of the quadratic approximations are updated.

Then, based on the quadratic approximation results updated in step S23, the central control unit 200 calculates again the estimated points PE (black square marks in FIG. 16) in step S24, calculates the ellipse equation (corresponding to the ellipse DE2 in FIG. 16) in step S25, and performs the calculation of the ellipse center in step S26 to obtain the ellipse center PC2 (see FIG. 16).

Next, in step S28, the central control unit 200 determines the validity of the ellipse center based on a relationship between the measurement points including the additional measurement points PM3 and the result (ellipse center PC2) of the ellipse center PC calculated again in step S26, proceeds to step S27 if it is valid, and proceeds to step S29 if it is invalid. Thus, until a valid ellipse center is calculated, the process of setting the additional measurement points PM3 and obtaining the ellipse center is performed repeatedly; when a valid ellipse center is calculated, the spherical aberration correction amount and focus balance value are set to the ellipse center.

In addition to the foregoing advantages (1) to (7), the following advantages (8) to (10) can be obtained from this embodiment described above.

(8) The optical information processing apparatus determines the validity of the measurements, and if it is determined that they are invalid, measures the signal characteristic at an additional measurement position and adjusts the spherical aberration correction amount and focus adjustment value from the measurement results including the signal characteristic measured at the additional measurement position. This makes it possible to perform the adjustment based on more appropriate measurement results.

(9) The optical information processing apparatus determines, from a relationship between the measurement positions and the obtained ellipse center, the validity of the ellipse center, and if it is invalid (or if there are likely to be problems), sets an additional measurement position, performs an additional measurement at the additional measurement position, and combining it with the measurement results at the existing measurement positions, obtains the ellipse center again. This makes it possible to obtain the ellipse center appropriately, and perform the adjustment appropriately. In particular, even if an optimum position of the spherical aberration correction amount and focus adjustment value is greatly displaced from the initially set measurement positions, the ellipse center can be calculated appropriately.

(10) If the obtained ellipse center is not within a predetermined range defined by the measurement positions (within a range of the measurement positions), the optical information processing apparatus determines that the measurements (or ellipse center) are invalid; if the ellipse center is within the range, it determines that it is valid. This aspect makes it possible to properly determine whether the obtained ellipse center is valid, and obtain the ellipse center properly.

In the above description, the additional measurement points PM are set on all of the existing straight lines Li, L2, and L3. However, in the case as shown in FIG. 16, the additional measurement point PM3 may be set only on the straight line L3. This is because, in the case as shown in FIG. 16, while the measurement range on each of the straight lines L1 and L2 includes a point at which the reproduced signal amplitude is maximum on the straight line and the quadratic approximation results are less likely to include large errors, the measurement range on the straight line L3 does not include a point at which the reproduced signal amplitude is maximum on the straight line and the quadratic approximation result is more likely to include a large error.

Although the above example sets the additional measurement points PM3 on the existing straight lines L1, L2, and L3, it is also possible to set the measurement points PM3 not on the existing straight lines, but so that a new straight line can be set with the existing measurement points PM and additional measurement points PM3.

The above example determines the validity of the measurements by determining the validity of the calculated ellipse center PC, but the validity of the measurements may be determined in other ways.

For example, if, for at least one of the at least three straight lines, a relationship between the measurement position and the signal characteristic measured at the measurement position is a monotonically increasing or decreasing relationship, the optical information processing apparatus may determine that the measurements are invalid; if the relationship is neither a monotonically increasing nor decreasing relationship, it may determine that the measurements are valid. For example, in step S28 in FIG. 15, the central control unit 200 determines, for each straight line, whether the relationship between the measurement position and the measurement result is a monotonically increasing or decreasing relationship, and if it is determined for at least one straight line that the relationship is a monotonically increasing or decreasing relationship, it determines that the measurements are invalid. Specifically, on a certain straight line, when the measurement results (reproduced signal amplitudes) at the respective measurement points PM are referred to as 'result 1', 'result 2', . . . , and 'result n' according to the order of the positions of the measurement points PM, if a monotonically increasing relationship in which 'result 1'<'result 2'< . . . <'result n' or a monotonically decreasing relationship in which 'result 1'> 'result 2'> . . . >'result n' is satisfied, it determines NO. When the relationship is a monotonically increasing or decreasing relationship, a range of the measurement points PM (or range of 'result 1' to 'result n') does not include the maximum of the reproduced signal amplitude, an error may occur in the quadratic approximation process. The central control unit 200 may perform the above determination after step S22 in FIG. 15, and if the determination is YES, proceed to step S23, and if the determination is NO, return to step S21 to add a measurement point and perform the measurement again.

For example, the central control unit 200 may obtain, from the result of the quadratic approximation process in step S23, a peak position of the quadratic approximation curve (position at which the reproduced signal amplitude is maximum), and determine NO if the peak position is not within a range of the measurement points PM. In this case, the central control unit 200 may perform the above determination in step S28 in FIG. 15, or may perform the above determination after step S23, and if the determination is YES, proceed to step S24, and if the determination is NO, return to step S21 to add a measurement point and perform the measurement again.

For example, the distribution of a contour line of the reproduced signal amplitude with respect to the spherical aberration correction amount and focus balance value may be measured in advance, and the ratio of the long axis to the short axis of the ellipse when the contour line is regarded as substantially an ellipse may be obtained in advance; the central control unit 200 may obtain the ratio of the long axis to the short axis from the ellipse equation calculated in step S25, compare the two ratio, and if the difference therebetween is not less than a predetermined value, determine NO. This determination may be performed in step S28 or following step S25.

Third Embodiment

The optical information processing apparatus and optical information processing method in the third embodiment will be described below. The optical information processing apparatus in the third embodiment differs from the optical information processing apparatus in the first embodiment in regard to the adjustment process but otherwise is the same. Descriptions of parts that are the same as in the first embodiment will be omitted or simplified in the description below, and the same reference characters will be used for elements that are the same as or correspond to those in the first embodiment.

Figure 17:
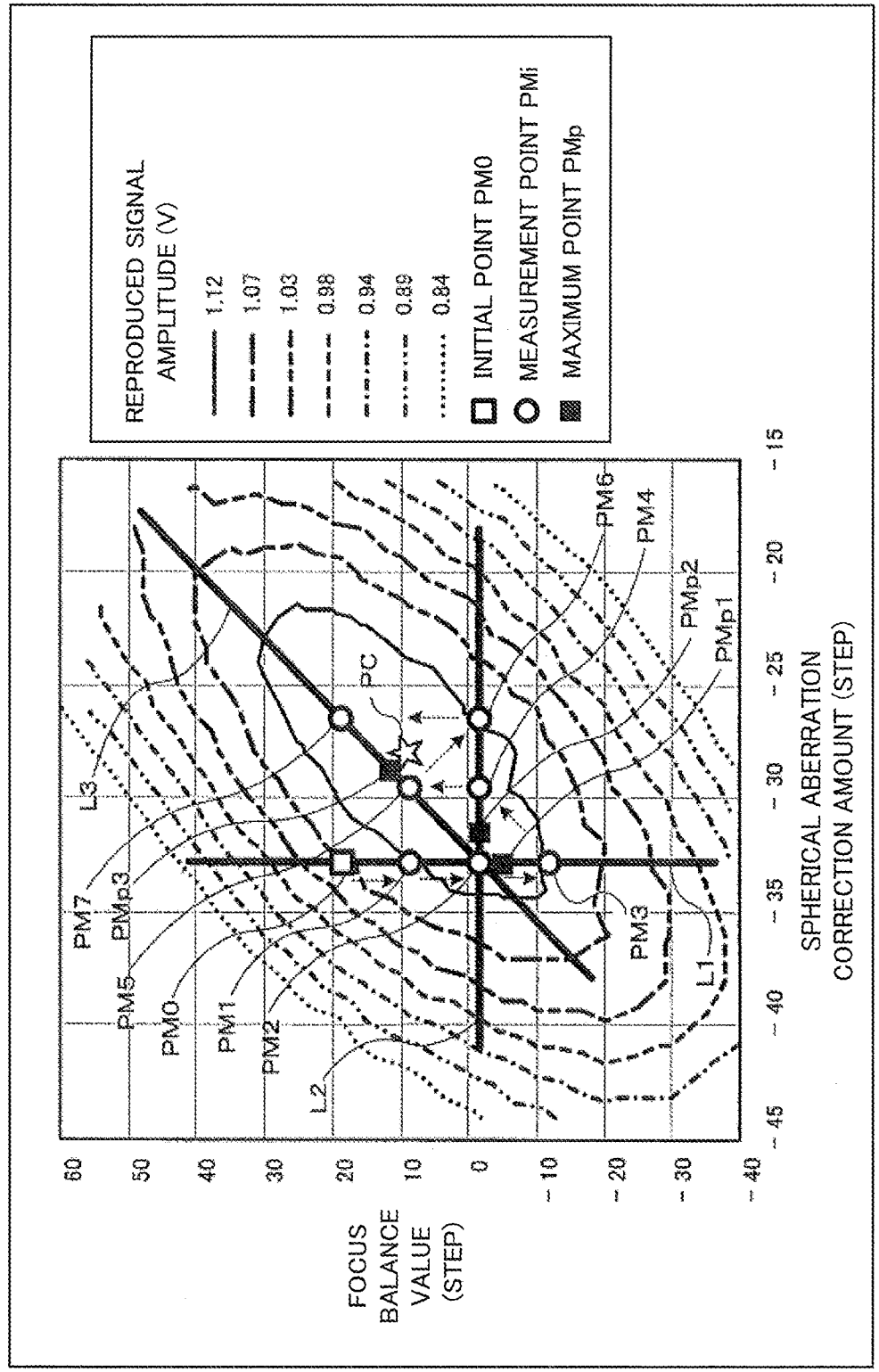
FIG. 17 is a diagram showing an exemplary arrangement of the measurement points in the third embodiment.

FIG. 17 shows, in addition to the distribution of the reproduced signal amplitude with respect to the spherical aberration correction amount and focus balance value shown in FIG. 4, measurement points, an ellipse center, and the like in the adjustment method in this embodiment. The adjustment process in this embodiment will be described below with reference to FIG. 17 as required.

In this embodiment, the at least three straight lines include a straight line (hereinafter referred to as the 'focus axis straight line') parallel to the coordinate axis (y-axis) of the focus adjustment value and at least two straight lines (hereinafter referred to as the 'remaining straight lines') different from the focus axis straight line. Each of the remaining straight lines is, for example, inclined with respect to the coordinate axis (x-axis) of the spherical aberration correction amount and the coordinate axis (y-axis) of the focus adjustment value. FIG. 17 shows a straight line L1 as the focus axis straight line, and straight lines L2 and L3 as the remaining straight lines. The straight line L2 is parallel to the x-axis. The straight line L3 is inclined with respect to the x- and y-axes and is substantially parallel to the long axis of the ellipse when a contour line of the signal characteristic on the x-y plane is regarded as an ellipse.

The central control unit 200 measures the signal characteristics of the reproduced signals at at least three measurement positions on the focus axis straight line, and then while sequentially changing the spherical aberration correction amount, each time the spherical aberration correction amount is changed, measures the signal characteristic of the reproduced signal at a measurement position at the changed spherical aberration correction amount on each of the remaining straight lines, thereby measuring the signal characteristic of the reproduced signal at each of the at least three measurement positions on each of the at least three straight lines. For example, as shown in FIG. 17, after measuring the signal characteristics at four measurement points PM0, PM1, PM2, and PM3 on the straight line L1, it changes the spherical aberration correction amount, measures the signal characteristics at the measurement points PM4 and PM5 at the changed spherical aberration correction amount on the straight lines L2 and L3, further changes the spherical aberration correction amount, and measures the signal characteristics at the measurement points PM6 and PM7 at the changed spherical aberration correction amount on the straight lines L2 and L3. In FIG. 17, the dashed arrows represent an order of the measurements. One example of the central control unit 200 is configured as below.

The central control unit 200 sets each of the remaining straight lines to pass through one of the at least three measurement positions on the focus axis straight line. In one preferred aspect, for the focus axis straight line, the central control unit 200 obtains, as an extreme position, a position at which the signal characteristic has an extreme value from an approximation result obtained by approximating a relationship between the measurement position and the signal characteristic measured at the measurement position by a second or higher order polynomial. Then, it sets each of the remaining straight lines to pass through one of the at least three measurement positions on the focus axis straight line near the extreme position. The measurement position near the extreme position is, for example, the measurement position nearest to the extreme position. In the example of FIG. 17, a maximum point PMp1 (black square mark) at which the reproduced signal amplitude is maximum on the straight line L1 is shown as the extreme position, and the straight lines L2 and L3 are set to pass through the measurement point PM2, which is nearest to the maximum point PMp1 among the measurement points on the straight line L1. However, the measurement position near the extreme position is not limited to the measurement position nearest to the extreme position; it may be a measurement position adjacent to the extreme position, or the like. The at least two remaining straight lines may be set to pass through the same measurement position as shown in FIG. 17, or may be set to pass through different measurement positions as shown in FIG. 12(a). When the at least two remaining straight lines pass through different measurement positions, the number of measurement positions can be reduced by setting the measurement position at an intersection between the remaining straight lines as shown in FIG. 12(a).

For each of the straight lines, until a range of the measurement positions includes a position at which the signal characteristic has an extreme value when a relationship between the measurement position and the signal characteristic measured at the measurement position is approximated by a second or higher order polynomial, the central control unit 200 measures the signal characteristic while changing the measurement position so as to extend the range of the measurement positions. Specifically, the range of the measurement positions is a range between the smallest and the largest of the spherical aberration correction amounts or focus adjustment values of the measurement positions.

For at least one straight line, after measuring the signal characteristics at at least two measurement positions, the central control unit 200 compares the signal characteristics at both ends of the at least two measurement positions, and determines, as the next measurement position, a position away from one of the ends having the higher signal characteristic in the direction opposite to the other end. Here, the higher signal characteristic means, for example, a larger signal characteristic when the signal characteristic is the reproduced signal amplitude, or a smaller signal characteristic when the signal characteristic is the i-MLSE value.

In this embodiment, when performing the ellipse approximation, the central control unit 200 makes a determination as to whether the result of the ellipse approximation represents an ellipse. Then, if it is determined that no ellipse is represented, it obtains the at least five estimated positions after changing the value (or level) of the signal characteristic, performs the ellipse approximation using the at least five estimated positions, and then makes the determination again. If it is determined that an ellipse is represented, it obtains the center of the ellipse from the result of the ellipse approximation representing the ellipse, and determines the spherical aberration correction amount and focus adjustment value based on the center of the ellipse.

Alternatively, the central control unit 200, for each of a plurality of values (or levels) of the signal characteristic, may obtain the at least five positions as the estimated positions, performs the ellipse approximation on the at least five estimated positions, and obtains an error between the result of the ellipse approximation and the at least five estimated positions; then, it may obtain the center of the ellipse from the result of the ellipse approximation having the smallest error among the plurality of results of the ellipse approximations corresponding to the plurality of values, and determine the spherical aberration correction amount and focus adjustment value based on the center of the ellipse.

Figure 18:
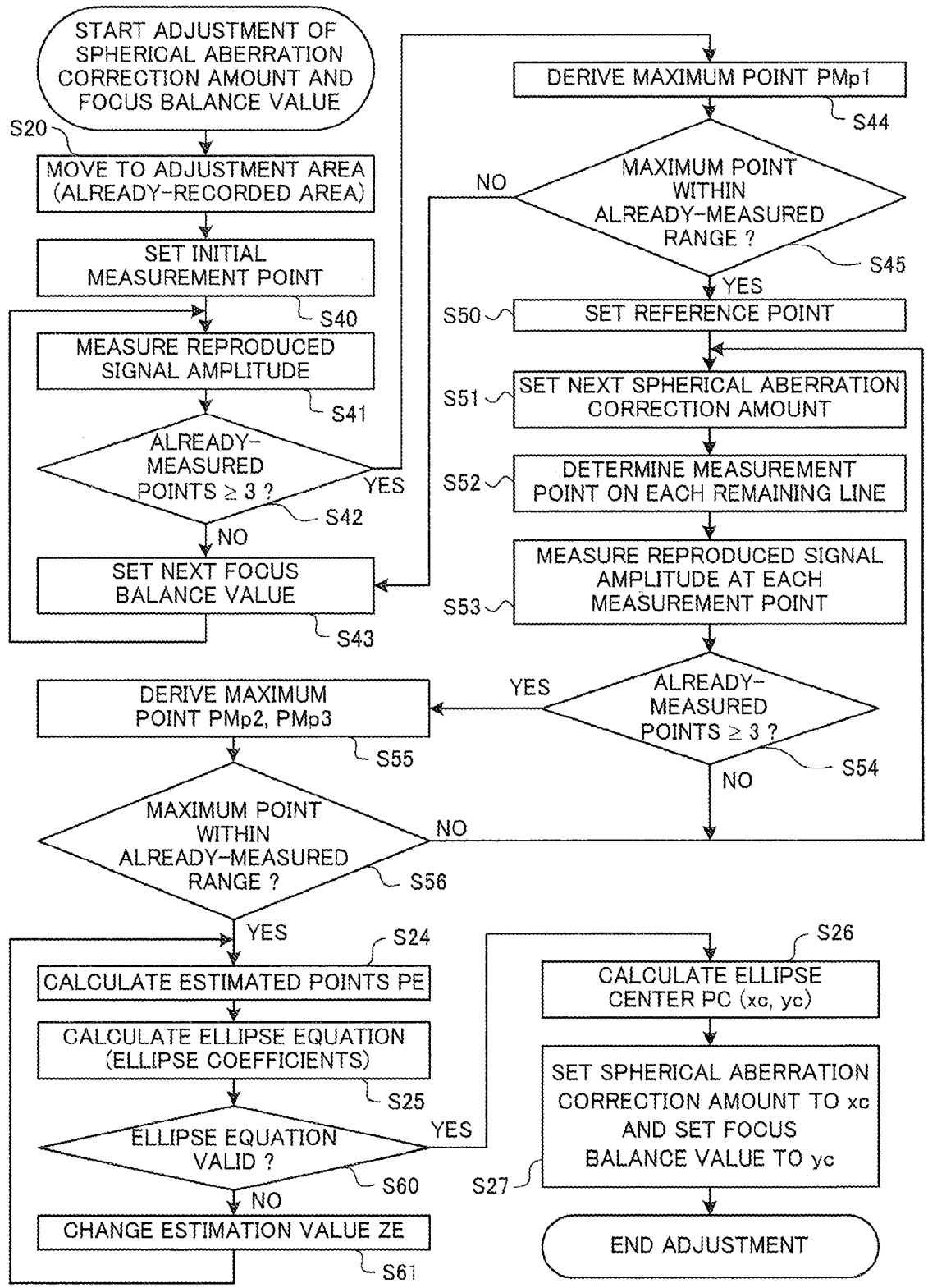
FIG. 18 is a flowchart showing an exemplary procedure of the adjustment of the spherical aberration correction amount and focus balance value in an optical information processing apparatus in a third embodiment.

FIG. 18 is a flowchart showing the adjustment process in the third embodiment. The adjustment process of FIG. 18 is performed, for example, in step S13 in FIG. 13 in place of the adjustment process of FIG. 14. The adjustment method of the spherical aberration correction amount and focus balance value in this embodiment will be described below with reference to FIGS. 17 and 18.

In step S20, as in the first embodiment, the central control unit 200 moves the optical head 300 to an adjustment area for adjusting the spherical aberration correction amount and focus balance value, thereby allowing signals in the adjustment area in the optical disc 500 to be reproduced.

Next, in step S40, the central control unit 200 sets the spherical aberration correction amount and focus balance value to the values corresponding to a predetermined initial measurement point PM0 (white square mark in FIG. 17) on the straight line L1.

Next, in step S41, the central control unit 200 measures the reproduced signal amplitude using the set spherical aberration correction amount and focus balance value. In step S42, the central control unit 200 determines whether the number of measurement points (hereinafter referred to as the 'already-measured measurement points') at which the measurement has been performed is not less than three.

If it is determined in step S42 that the number of already-measured measurement points is less than three (if NO), the central control unit 200 proceeds to step S43 to set a focus balance value for the next measurement. Here, the spherical aberration correction amount is not changed from that of the initial measurement point PM0. That is, the process in step S43 corresponds to an operation of changing the measurement point on the straight line L1 in FIG. 17 to determine the next measurement point. Then, the central control unit 200 returns to step S41, measures the reproduced signal amplitude at the focus balance value changed in step S43, and proceeds to step S42.

If it is determined in step S42 that the number of already-measured measurement points is not less than three (if YES), the processing proceeds to step S44. Thus, until the determination in step S42 is YES, the process of steps S43, S41 and S42 are performed repeatedly; when the determination in step S42 is YES, the processing proceeds to step S44.

In step S44, the central control unit 200 performs the quadratic approximation on a relationship between the already-measured measurement point and the reproduced signal amplitude, and, based on the result, obtains a point on the straight line L1 at which the reproduced signal amplitude is maximum, as the maximum point PMp1. FIG. 17 shows the maximum point PMp1 with the black square mark on the straight line L1. In step S44, the maximum point PMp1 may be obtained by performing a third or higher order approximation instead of the quadratic approximation. In this case, it is necessary to appropriately set the number used as the threshold value in the determination in step S42 in accordance with the order of the approximation, specifically, to be equal to or larger than the minimum number required for the approximation. By setting the number used as the threshold value in the determination in step S42 to be larger than the minimum number required for the approximation, the accuracy of the approximation can be improved.

Next, in step S45, the central control unit 200 determines whether the maximum point PMp1 is within a range of the already-measured measurement points. Specifically, it determines whether the focus balance value of the maximum point PMp1 is between the smallest and the largest of the focus balance values of the already-measured measurement points.

If it is determined in step S45 that the maximum point PMp1 is outside the already-measured range (if NO), the central control unit 200 returns to step S43 to set a focus balance value for the next measurement, and returns to step S41.

If it is determined in step S45 that the maximum point PMp1 is within the already-measured range (if YES), the processing proceeds to step S50. Thus, until the determination in step S45 is YES, the process of steps S43, S41, S42, and S44 are performed repeatedly; when the determination in step S45 is YES, the processing proceeds to step S50.

FIG. 17 shows a case where, when the reproduced signal amplitudes have been measured at the measurement points PM0, PM1, PM2, and PM3 in this order along the straight line L1 with the focus balance value decreased and the number of measurement points has reached four, the maximum point PMp1 has become within the measurement range.

Here, in the setting of the focus balance value, instead of merely decreasing or increasing the focus balance value in one direction, it is desirable to efficiently set the focus balance value by using the measurement results at the already-measured measurement points so that the maximum point of the reproduced signal amplitude becomes within the range of the measurement points with the smallest possible number of measurement points. For example, among the reproduced signal amplitudes at the already-measured measurement points, the reproduced signal amplitude at the measurement point with the largest focus balance value and the reproduced signal amplitude at the measurement point with the smallest focus balance value are compared with each other, and the focus balance value of the next measurement point is set so that the range of the measurement points is extended using the measurement point having the higher reproduced signal amplitude as a basis. For example, when the measurement point with the largest focus balance value is used as the basis, the next focus balance value is set by adding predetermined steps to the focus balance value of the basis measurement point; when the measurement point with the smallest focus balance value is used as the basis, the next focus balance value is set by subtracting predetermined steps from the focus balance value of the basis measurement point.

The measurement point next to the initial measurement point PM0 may be set based on the initial measurement point PM0 and the characteristic of the reproduced signal amplitude with respect to the spherical aberration correction amount and focus balance value in the optical information processing apparatus as follows. For example, in an optical information processing apparatus in which the focus balance value of the point at which the reproduced signal amplitude is maximum (i.e., optimum focus balance value) is likely to be near a reference value (e.g., zero), when the focus balance value of the initial measurement point PM0 is larger than the reference value, the focus balance value of the next measurement point is set by subtracting the predetermined steps from the focus balance value of the initial measurement point PM0, and when the focus balance value of the initial measurement point PM0 is smaller than the reference value, the focus balance value of the next measurement point is set by adding the predetermined steps to the focus balance value of the initial measurement point PM0. This raises the possibility that the next measurement point is set so that the reproduced signal amplitude is increased. In the above configuration, for example, it is possible to measure in advance optimum focus balance values for a plurality of discs and a plurality of optical information processing apparatus, and set an average thereof as the reference value in the optical information processing apparatus.

In step S50, the central control unit 200 sets reference points of the straight lines L2 and L3 to the measurement point (measurement point PM2 in the example of FIG. 17) nearest to the maximum point PMp1 among the measurement points on the straight line L1. The reference point of the straight line L2 is a point through which the straight line L2 passes; the reference point of the straight line L3 is a point through which the straight line L3 passes. Thus, in step S50, the straight lines L2 and L3 are set. The measurement points set as the reference points need only be near the maximum point PMp1; they need not necessarily be nearest to the maximum point PMp1. The reference points of the straight lines L2 and L3 may be set to different measurement points. For example, in FIG. 17, the measurement point PM2, which is nearest to the maximum point PMp1, may be set as the reference point of the straight line L3, and the measurement point PM3, which is second nearest to the maximum point PMp1, may be set as the reference point of the straight line L2.

In step S51, the central control unit 200 sets the next spherical aberration correction amount. When step S51 is performed for the first time (in the example of FIG. 17, after the measurements at the measurement points PM0 to PM3, when the spherical aberration correction amount of the next measurement point is set in step S51), the central control unit 200 determines the next spherical aberration correction amount based on the focus balance value of the reference points set in step S50. For example, in an optical information processing apparatus in which the distribution of the reproduced signal characteristic is inclined to the right with respect to the y-axis as shown in FIG. 17 and the focus balance value of a point at which the reproduced signal amplitude is maximum (i.e., optimum focus balance value) is near a reference value (e.g., zero) in many cases, when the focus balance value of the reference points is larger than the reference value, the next spherical aberration correction amount is determined by subtracting predetermined steps from the spherical aberration correction amount of the reference points, and when the focus balance value of the reference points is smaller than the reference value, the next spherical aberration correction amount is determined by adding predetermined steps to the spherical aberration correction amount of the reference points. This raises the possibility that the next measurement point is set so that the reproduced signal amplitude is increased, especially on the straight line L3. In the above configuration, for example, optimum focus balance values may be measured in advance for a plurality of discs in a plurality of optical information processing apparatus, and for example, an average thereof may be set as the reference value in the optical information processing apparatus. In an optical information processing apparatus in which the distribution of the reproduced signal characteristic is inclined to the left with respect to the y-axis, a process opposite to the above process may be performed. The process in step S51 is not limited to the above; for example, in the first round of execution of step S51, the spherical aberration correction amount may be changed in a predetermined direction by predetermined steps regardless of the reference points, and in the second or later round of execution of step S51, the spherical aberration correction amount of the next measurement point may be determined based on whether the previous change of the spherical aberration correction amount increases the reproduced signal amplitude.

Next, in step S52, the central control unit 200 determines the points on the remaining straight lines L2 and L3 corresponding to the spherical aberration correction amount determined in step S51 as the next measurement points on the remaining straight lines L2 and L3, respectively. In the example in FIG. 17, as the next measurement points on the remaining straight lines L2 and L3, the measurement points PM4 and PM5 are determined in the first round of execution of step S52, and the measurement points PM6 and PM7 are determined in the second round of execution of step S52, respectively.

Next, in step S53, the central control unit 200 measures the reproduced signal amplitude at each of the measurement points on the straight lines L2 and L3 determined in step S52. In step S54, the central control unit 200 determines whether the number of already-measured measurement points on each of the straight lines is not less than three.

If it is determined in step S54 that the number of already-measured measurement points is less than three (if NO), the central control unit 200 returns to step S51 to determine the spherical aberration correction amount for the next measurement, and then measures the reproduced signal amplitudes at the next measurement points (steps S52 and S53), and proceeds to step S54.

If it is determined in step S54 that the number of already-measured measurement points is not less than three (if YES), the processing proceeds to step S55. Thus, until the determination in step S54 is YES, the process of steps S51 to S54 are performed repeatedly; when the determination in step S54 is YES, the processing proceeds to step S55.

This example performs, in steps S52 and S53, the processes for the straight lines L2 and L3 in parallel, but it is also possible to perform the process of steps S52 and S53 for the straight line L2, then perform the process of steps S52 and S53 for the straight line L3, and proceed to step S54. Depending on the setting of the straight lines L2 and L3, the measurement points of the straight lines L2 and L3 may be located at the same point. In this case, instead of performing the process with the measurement points of the straight lines L2 and L3 as separate measurement points, it is desirable to perform the process of steps S52 and S53 with them as a common measurement point.

In step S55, for each of the straight lines L2 and L3, the central control unit 200 performs the quadratic approximation on a relationship between the already-measured measurement point and the reproduced signal amplitude, and obtains, from the result, a point on the straight line at which the reproduced signal amplitude is maximum as a maximum point. Thereby, the central control unit 200 obtains the maximum point PMp2 on the straight line L2 and the maximum point PMp3 on the straight line L3. FIG. 17 shows the maximum points PMp2 and PMp3 with the black square marks on the straight lines L2 and L3, respectively. In step S55, the maximum points may be obtained by performing a third or higher order approximation instead of the quadratic approximation, as in step S44. In this case, it is necessary to appropriately set the number used as the threshold value in the determination in step S54 in accordance with the order of the approximation, specifically, to be equal to or larger than the minimum number required for the approximation. The order of the approximation may be the same or different among all the straight lines. By setting the number used as the threshold value in the determination in step S54 to be larger than the minimum number required for the approximation, the accuracy of the approximation can be improved. The number used as the threshold value in the determination in step S54 may be the same or different between the straight lines L2 and L3.

Next, in step S56, for each of the straight lines L2 and L3, the central control unit 200 determines whether the maximum point obtained in step S55 is within a range of the already-measured measurement points. Specifically, it determines, for the straight line L2, whether the spherical aberration correction amount of the maximum point PMp2 is between the smallest and the largest of the spherical aberration correction amounts of the already-measured measurement points, and determines, for the straight line L3, whether the spherical aberration correction amount (or focus balance value) of the maximum point PMp3 is between the smallest and the largest of the spherical aberration correction amounts (or focus balance values) of the already-measured measurement points.

If it is determined in step S56 that the maximum point of any of the straight lines is outside the already-measured range (if NO), the central control unit 200 returns to step S51 to perform again the process of steps S51 to S56. This process should be performed, of the straight lines L2 and L3, for only a straight line or straight lines for which the maximum point is determined to be outside the already-measured range.

If it is determined in step S56 that the maximum point of each straight line is within the already-measured range (if YES), the processing proceeds to step S24. Thus, until the determination in step S56 is YES, the process of steps S51 to S56 is performed repeatedly; when the determination in step S56 is YES, the processing proceeds to step S24.

In step S24, based on the approximation results in steps S44 and S55, as in the first embodiment, the central control unit 200 calculates, for each of the straight lines L1, L2, and L3, positions at which the reproduced signal amplitude has the estimation value ZE as the estimated points PE.

Next, in step S25, as in the first embodiment, the central control unit 200 calculates the ellipse equation (or ellipse coefficients constituting the ellipse equation) from the estimated points PE obtained in step S24.

Next, in step S60, the central control unit 200 determines whether the ellipse equation (or set of the ellipse coefficients) calculated in step S25 is valid. An ellipse equation (formula (3)) can represent, depending on the coefficients, not only an ellipse (including a circle) but also other shapes, such as a hyperbola, a parabola, and two parallel straight lines. Thus, in step S60, it is determined whether the calculated ellipse equation (or set of the ellipse coefficients) represents an ellipse. Specifically, a determination value T is obtained by using the ellipse coefficients according to the following formula (11). If T<0, it is determined that an ellipse is represented; otherwise, it is determined that no ellipse is represented:

$$T=B^2-4\times A\times C \qquad (11).$$

If it is determined in step S60 that the ellipse equation does not represent an ellipse (if NO), the central control unit 200 proceeds to step S61 to change the estimation value ZE, and then based on the changed estimation value ZE, performs the calculation of the estimated points PE (step S24), the calculation of the ellipse equation (step S25), and the determination as to whether the ellipse equation is valid (step S60).

If it is determined in step S60 that the ellipse equation represents an ellipse (if YES), the processing proceeds to step S26. Thus, until the determination in step S60 is YES, the process of steps S61, S24, S25, and S60 is performed repeatedly; when the determination in step S60 is YES, the processing proceeds to step S26.

In step S60, in addition to the determination as to whether the ellipse equation represents an ellipse, it is possible to obtain errors between the ellipse obtained from the ellipse equation and the respective estimated points PE, calculate, from the obtained errors, a value (e.g., sum or average of the errors) indicating a degree of matching between the ellipse equation and the estimated points PE, determine whether the calculated value is not larger than a predetermined value, and if it is not larger than the predetermined value, determine that the ellipse equation is valid, and otherwise, determine that the ellipse equation is invalid. It is also possible to set multiple estimation values ZE in step S24, calculate the estimated points PE corresponding to the respective estimation values ZE, obtain sets of the ellipse coefficients corresponding to the respective estimation values ZE in step S25, determine, as the set of the ellipse coefficients to be used to calculate the ellipse center, a set of the ellipse coefficients having the smallest error from the estimated points PE among the sets of the ellipse coefficients corresponding to the multiple estimation values ZE, and proceed to step S26.

In step S26, as in the first embodiment, the central control unit 200 calculates the ellipse center PC (xc, yc) from the ellipse equation (or ellipse coefficients) obtained in step S25. Then, in step S27, as in the first embodiment, the central control unit 200 sets the spherical aberration correction amount and focus balance value to the ellipse center PC obtained in step S26.

The following advantages (11) to (18) can be obtained from this embodiment described above.

(11) The optical information processing apparatus, after measuring the signal characteristics at at least three measurement positions on the focus axis straight line, sequentially changes the spherical aberration correction amount, and each time the spherical aberration correction amount is changed, measures the signal characteristic at a measurement position on each of the remaining straight lines corresponding to the changed spherical aberration correction amount. This aspect makes it possible to reduce the number of changes of the spherical aberration correction amount, which takes time to be changed, and reduce the time required for the adjustment.

(12) Each of the remaining straight lines passes through one of the at least three measurement positions on the focus axis straight line. This makes it possible to use the measurement results at the measurement positions on the focus axis straight line for the remaining straight lines, and reduce the number of measurements.

(13) Each of the remaining straight lines passes through a measurement position near the extreme position on the focus axis straight line among the at least three measurement positions on the focus axis straight line. This aspect makes it possible, when a remaining straight line substantially parallel to the long axis of the ellipse is set, to set the remaining straight line to pass near a point at which the signal characteristic is maximum, and obtain the approximation ellipse accurately.

(14) The optical information processing apparatus sets the next measurement position in accordance with the measurement results at the already-measured measurement positions. This makes it possible to avoid a measurement at an unnecessary measurement position, perform a measurement at an effective measurement position, and efficiently adjust the spherical aberration correction amount and focus adjustment value in comparison with a case where all the measurement positions are set in advance.

(15) For each of the straight lines, until a range of the measurement positions includes a position at which the signal characteristic has an extreme value when a relationship between the measurement position and the signal characteristic is approximated by a second or higher order polynomial, the optical information processing apparatus measures the signal characteristic while changing the measurement position so as to extend the range of the measurement positions. This aspect makes it possible to obtain the estimated positions more accurately and perform the adjustment more properly.

(16) For at least one straight line, the optical information processing apparatus compares the signal characteristics at both ends of the at least two already-measured measurement positions, and determines, as the next measurement position, a position away from one of the ends having the higher signal characteristic in a direction opposite to the other end. This aspect makes it possible to set the measurement positions efficiently.

(17) The optical information processing apparatus determines whether the result of the ellipse approximation represents an ellipse, and if it is determined that no ellipse is represented, performs again the ellipse approximation after changing the value of the signal characteristic (specifically, the estimation value ZE). This aspect makes it possible to prevent the adjustment from being performed by using an inappropriate approximation result representing no ellipse.

(18) For each of a plurality of values of the signal characteristic (specifically, the estimation values ZE), the optical information processing apparatus obtains the estimated positions to perform the ellipse approximation, and obtains an error between the result of the ellipse approximation and the estimated positions; then, it obtains the center of the ellipse from the result of the ellipse approximation having the smallest error. This makes it possible to obtain the center of the ellipse more accurately in comparison with a case where the center of the ellipse is obtained from the result of the ellipse approximation corresponding to a single value.

In the adjustment process in FIG. 18, for example, when the number of measurement points on the straight lines L2 and L3 reaches or exceeds a predetermined number, or when the difference in the spherical aberration correction amount between the initial measurement point PM0 and the maximum point obtained in step S55 reaches or exceeds a predetermined amount, the central control unit 200 may set a new straight line L4 parallel to the coordinate axis of the focus balance value, perform the same processes as those of steps S40 to S45 for the straight line L4, and then perform the process of step S24 and subsequent steps by using the result of the straight line L4 in place of the result of the straight line L1. In this case, the number of additional measurement points can be suppressed by setting a spherical aberration correction amount at which the measurement has already been performed in steps S51 to S56 as a spherical aberration correction amount for the straight line L4 and setting an already-measured measurement point on another straight line as a measurement point on the straight line L4. The reason for setting the new straight line L4 is to prevent deterioration of the accuracy of the ellipse approximation when the spherical aberration correction amount of the straight line L1 is far from the optimum value. The accuracy of the adjustment can be improved by using the measurement results at the measurement points on the straight line L4 instead of those on the straight line L1.

The arrangement of the straight lines and measurement points may be an arrangement different from that shown in FIG. 17, such as the arrangements shown in FIG. 12.

Fourth Embodiment

The optical information processing apparatus and optical information processing method in the fourth embodiment will be described below. Descriptions of parts that are the same as in the first embodiment will be omitted or simplified in the description below, and the same reference characters will be used for elements that are the same as or correspond to those in the first embodiment.

In this embodiment, the optical information processing apparatus 100 is an optical recording apparatus for recording information on the optical disc 500, and further adjusts a focus adjustment value (here, focus balance value) for recording that is used during recording.

Specifically, the optical information processing apparatus 100 includes, in addition to the configuration shown in FIG. 1, control units required for recording on the optical disc 500, such as a data encoder for encoding user data from a host controller into data to be recorded on the optical disc 500, and a control unit regarding write strategy control for controlling the emission of a laser during recording on the optical disc 500. Such control units for recording may be included in the central control unit 200.

In general, an optical recording apparatus switches, when recording data, a gain in converting an optical signal of a light receiving element of an optical head into an electrical signal from a higher gain for reproduction to a lower gain for recording. This is because, since a recording power (optical power) used during recording is higher than a reproduction power (optical power) used during reproduction, if the gain is kept at the gain for reproduction, the signal output from the light receiving element is saturated, and the responsiveness of the light receiving element deteriorates, adversely affecting servo signals sampled and detected during recording.

Since the change of the gain of the light receiving element changes the optimum focus balance value, it is desirable to set, during data recording, a focus balance value different from that during reproduction, and general optical recording apparatus often use two focus balance values for reproduction and recording during reproduction and recording, respectively, by switching them.

Also in this embodiment, the optical information processing apparatus 100 uses, as a gain of the light receiving element 370 of the optical head 300, a higher gain for reproduction during reproduction and a lower gain for recording during recording. The optical information processing apparatus 100 uses a focus balance value for reproduction during reproduction and a focus balance value for recording during recording.

The optical information processing apparatus 100 in this embodiment is configured to, after optimally adjusting the spherical aberration correction amount and focus balance value for reproduction in the same manner as in the first to third embodiments, further optimally adjust the focus balance value for recording.

A relationship between the focus balance value during recording (hereinafter referred to as the 'recording focus balance value') and the reproduced signal characteristic will now be described. The following description takes, as an example, results obtained by performing recording on the second layer of a three-layer BD-RE disc while changing the recording focus balance value and actually measuring the reproduced signal characteristics with an optimum focus balance value for reproduction.

Figure 19A:
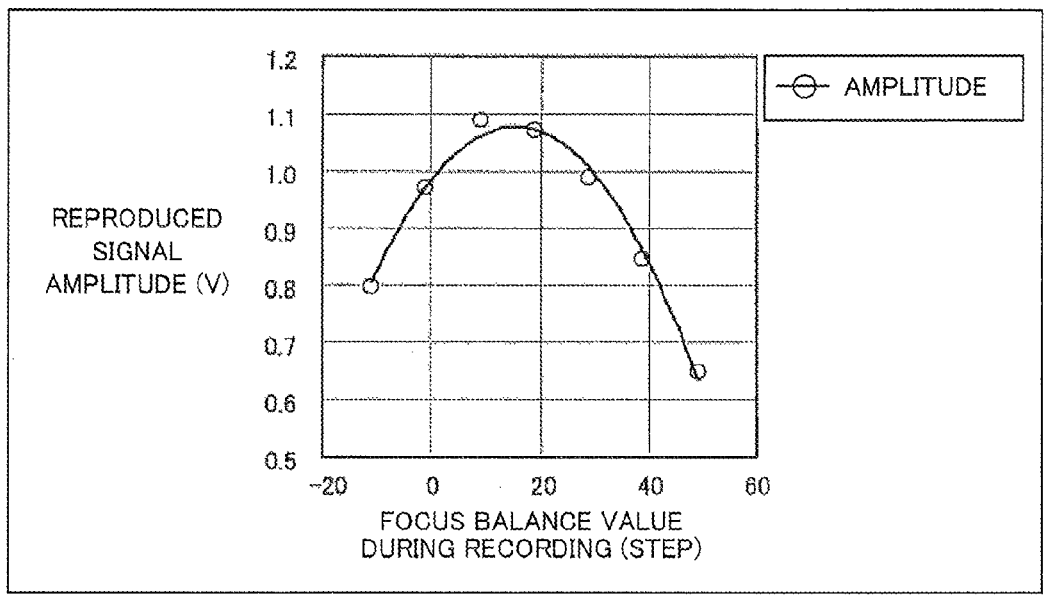
FIG. 19(a) is a graph showing an example of a relationship between a focus balance value in recording and the reproduced signal amplitude.
Figure 19B:
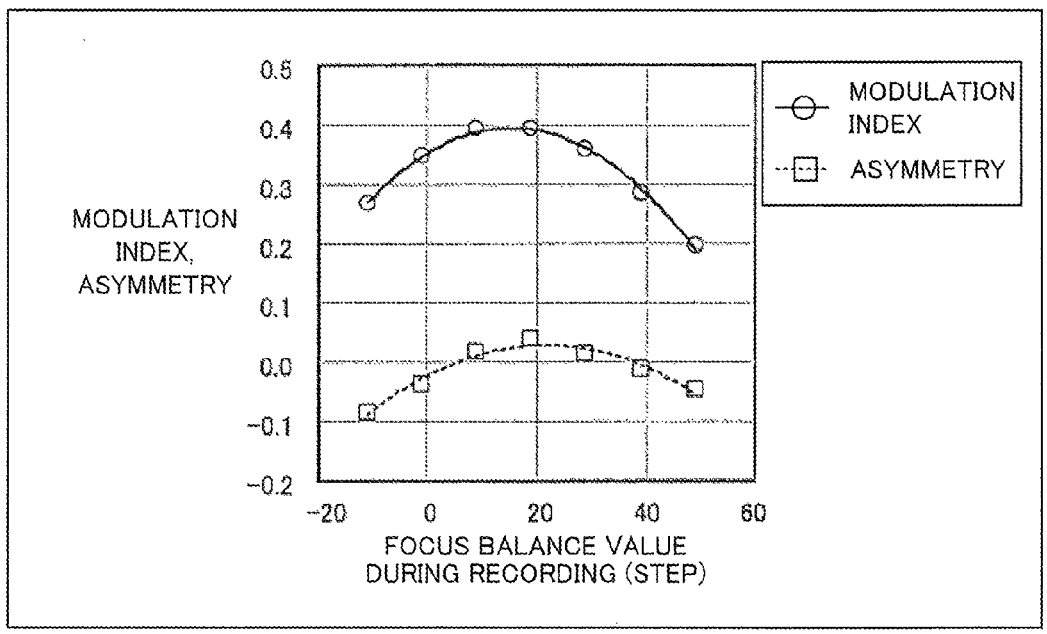
FIG. 19(b) is a graph showing an example of a relationship between a focus balance value in recording and an asymmetry.

FIG. 19(a) is a graph showing a relationship between the recording focus balance value and the reproduced signal amplitude. FIG. 19(b) is a graph showing relationships between the recording focus balance value and the reproduced signal characteristics (modulation index and asymmetry). In the measurements of FIGS. 19(a) and 19(b), only the recording focus balance value is changed; when the reproduced signal characteristics (amplitude, modulation index, and asymmetry) are measured, the optimum focus balance value for reproduction (value common to all the measurements) is used. In FIG. 19(a), the circle marks represent measurement results (actually measured values) of the reproduced signal amplitude; the solid line is an approximation curve obtained by performing a quadratic approximation on the actually measured values represented by the circle marks. In FIG. 19(b), the circle and square marks represent measurement results (actually measured values) of the modulation index and asymmetry, respectively; the solid and dashed lines are approximation curves obtained by performing quadratic approximations on the actually measured values represented by the circle and square marks, respectively. From FIGS. 19(a) and 19(b), it can be seen that the relationship between the recording focus balance value and each of the reproduced signal amplitude, modulation index, and asymmetry can be approximated by a quadratic equation.

The above description illustrates the actual measurement results regarding the second layer of the BD-RE. However, the same results are obtained regarding other layers or other types of discs although there are differences in the shapes of the curves.

In this embodiment, the adjustment unit 202 functions as a recording adjustment means for adjusting the focus adjustment value (here, focus balance value) for recording. Specifically, the adjustment unit 202 performs test recording onto the optical disc 500 using a fixed recording power while changing the recording focus balance value, reproduces the signals recorded by the test recording with a fixed focus balance value (e.g., focus balance value for reproduction) to measure the signal characteristics of the reproduced signals, approximates a relationship between the recording focus balance value and the measured signal characteristic by a second or higher order polynomial, obtains, from the result of the approximation, the recording focus balance value at which the signal characteristic is maximum, and determines the obtained recording focus balance value as the focus balance value for recording.

Figure 20:
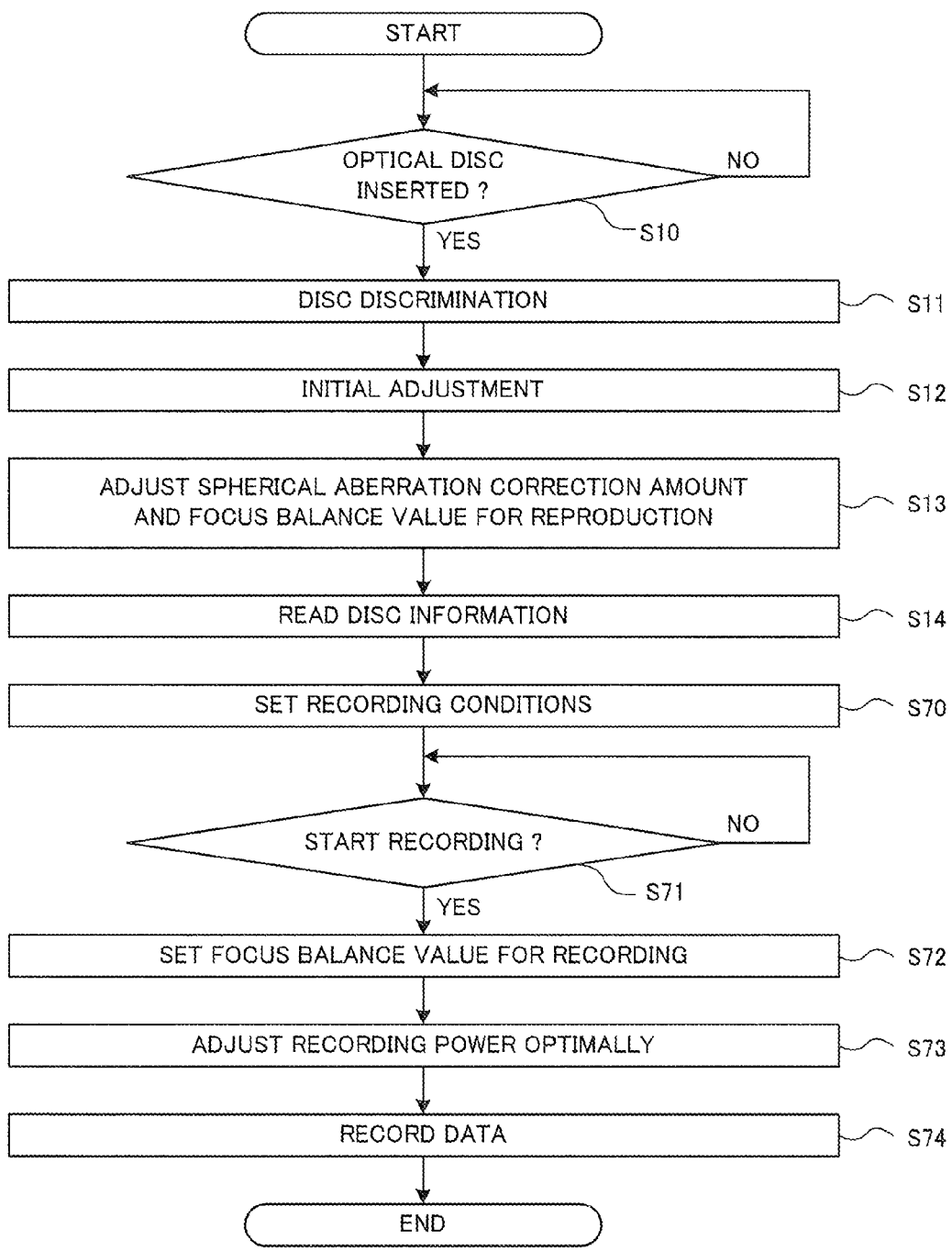
FIG. 20 is a flowchart showing an exemplary procedure of the recording operation of an optical information processing apparatus in a fourth embodiment.

FIG. 20 is a flowchart showing an exemplary procedure of the recording operation of the optical information processing apparatus 100 in the fourth embodiment. The procedure of the recording operation of the optical information processing apparatus 100 will described below with reference to FIG. 20. The process of steps S10 to S14 in FIG. 20 is generally the same as in FIG. 13, but the process after step S14 in FIG. 20 is related to recording, differing from that in FIG. 13.

After information, such as information specific to the optical disc and control information for controlling recording/reproducing operation, is read from the optical disc 500 in step S14, the central control unit 200 sets conditions (conditions for the write strategy or recording power adjustment) relating to recording in step S70, and waits until a recording command is given. Upon detecting the recording command in step S71, the central control unit 200 adjusts, in step S72, the focus balance value for recording to be used during recording.

Next, in step S73, the central control unit 200 adjusts the recording power to an optimum power by performing test writing in a test recording area of the optical disc 500. When the recording power is adjusted in step S73, the focus balance value for recording adjusted in step S72 is used.

Next, in step S74, data recording onto the optical disc 500 is started using the focus balance value for recording and recording power adjusted in steps S72 and S73.

Figure 21:
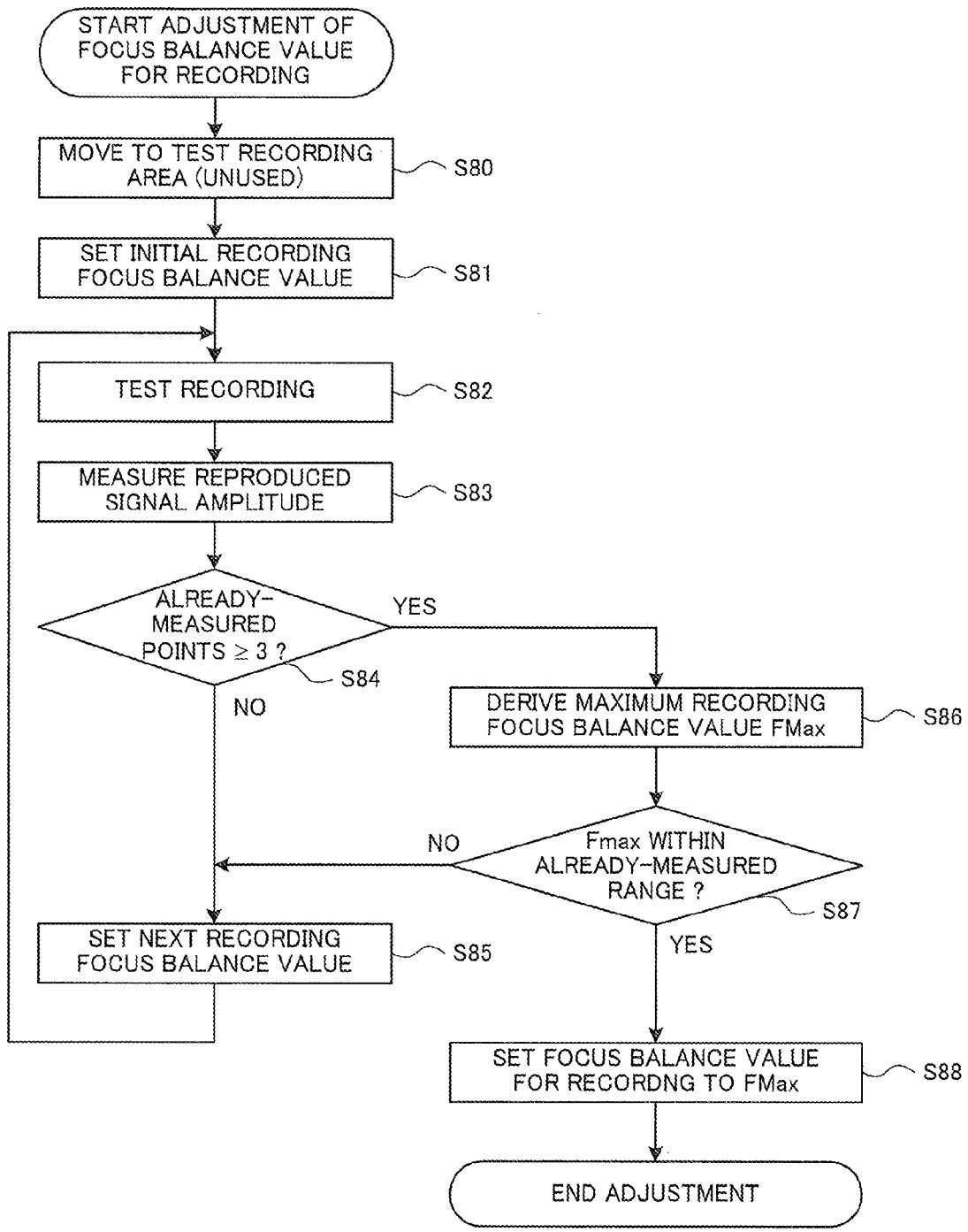
FIG. 21 is a flowchart showing an exemplary procedure of the adjustment of a focus balance value for recording in the optical information processing apparatus in the fourth embodiment.

FIG. 21 is a flowchart showing the process of step S72 in FIG. 20. The adjustment of the focus balance value for recording in step S72 will be described below with reference to FIG. 21.

First, in step S80, the central control unit 200 controls the sled motor 151 via the sled motor control unit 150 to move the optical head 300 to a test recording area for adjusting the focus balance value for recording.

Here, the test recording area is an area in which test recording for optimizing the recording power or the like can be performed on the optical disc 500, and an area provided on an inner or outer circumference of the optical disc separately from a data area.

Next, in step S81, the central control unit 200 sets the recording focus balance value to an initial value. For example, the focus balance value for reproduction adjusted in step S13 is used as the initial value. However, the initial value is not limited to the adjusted focus balance value for reproduction; it may be a predetermined focus balance value. It is also possible to measure in advance a relationship (or difference) between the focus balance values for recording and reproduction or the like, and use, as the initial value, a value obtained by offsetting the focus balance value for reproduction adjusted in step S13 by the relationship amount (or difference) between the focus balance values for recording and reproduction. Regarding the spherical aberration correction amount, the spherical aberration correction amount adjusted in step S13 is used as a fixed value, for example.

Next, in step S82, the central control unit 200 performs test recording using the set recording focus balance value. This test recording uses a fixed recording power. Thus, the test recording is all performed by using the same recording power during the adjustment process (process in step S72) of the focus balance value for recording. The fixed recording power need only have a level at which the reproduced signal amplitude can be detected when the recorded signal is reproduced; it need not necessarily be an optimum recording power. For example, it is possible to use, as the fixed recording power, a recording power described in the control information read from the optical disc 500 in step S14. It is also possible to optimally adjust the recording power before setting the fixed recording power, and use the adjusted optimum recording power as the fixed recording power. The amount recorded by the test recording need only be an amount allowing the reproduced signal amplitude to be measured; it is desirably as small as possible, from the view point of reducing the usage amount of the test recording area.

Next, in step S83, the central control unit 200 reproduces the signal test-recorded in step S82 to measure the reproduced signal amplitude. In this measurement, the reproduction is performed using a fixed focus balance value. Thus, in the measurements of the reproduced signal amplitude during the adjustment process (process of step S72) of the focus balance value for recording, the reproduction is performed using the same focus balance value. The fixed focus balance value includes, but is not limited to, the focus balance value for reproduction (focus balance value adjusted in step S13), for example.

In step S84, the central control unit 200 determines whether the number of measurement points at which the measurement has been performed (hereinafter referred to as the 'already-measured measurement points') is not less than three.

If it is determined in step S84 that the number of already-measured measurement points is less than three (if NO), the central control unit 200 proceeds to step S85 to set the recording focus balance value for the next measurement. Then, it returns to step S82 to perform test recording by using the recording focus balance value set in step S85, measures the reproduced signal amplitude of the test-recorded signal (step S83), and proceeds to step S84.

Here, in the setting of the recording focus balance value, instead of merely decreasing or increasing the recording focus balance value in one direction, it is desirable to efficiently set the recording focus balance value by using the measurement results of the already-measured measurement points so that the maximum point of the reproduced signal amplitude becomes within the range of the measurement points with the smallest possible number of measurement points. For example, among the reproduced signal amplitudes at the recording focus balance values (hereinafter referred to as the 'already-measured recording focus balance values') at which the measurement has been performed, the reproduced signal amplitude at the largest recording focus balance value and the reproduced signal amplitude at the smallest recording focus balance value are compared with each other, and the recording focus balance value of the next measurement point is set so that the range of the measurement points is extended using the recording focus balance value having the higher reproduced signal amplitude as a basis. For example, when the largest recording focus balance value is used as the basis, the next recording focus balance value is set by adding predetermined steps to the basis; when the smallest recording focus balance value is used as the basis, the next recording focus balance value is set by subtracting predetermined steps from the basis.

The recording focus balance value next to the initial recording focus balance value may be set based on the initial recording focus balance value and the characteristic of the reproduced signal amplitude with respect to the spherical aberration correction amount and recording focus balance value in the optical information processing apparatus as follows. For example, in an optical information processing apparatus in which the recording focus balance value at which the reproduced signal amplitude is maximum (i.e., optimum recording focus balance value) is likely to be near a reference value (e.g., zero), when the initial recording focus balance value is larger than the reference value, the next recording focus balance value is set by subtracting predetermined steps from the initial recording focus balance value, and when the initial recording focus balance value is smaller than the reference value, the next recording focus balance value is set by adding predetermined steps to the initial recording focus balance value. This raises the possibility that the next measurement point is set so that the reproduced signal amplitude is increased. In the above configuration, for example, it is possible to measure in advance optimum recording focus balance values for a plurality of discs and a plurality of optical information processing apparatus, and set an average thereof as the reference value in the optical information processing apparatus.

If it is determined in step S84 that the number of already-measured measurement points is not less than three (if YES), the processing proceeds to step S86. Thus, until the determination in step S84 is YES, the process of steps S85, S82, S83, and S84 is performed repeatedly, and when the determination in step S84 is YES, the processing proceeds to step S86.

In step S86, the central control unit 200 performs a quadratic approximation on a relationship between the already-measured recording focus balance value and the reproduced signal amplitude, and based on the result, obtains a maximum recording focus balance value FMax at which the reproduced signal amplitude is maximum. In step S86, it is possible to obtain the maximum recording focus balance value FMax by performing a third or higher order approximation instead of the quadratic approximation. In this case, it is necessary to appropriately set the number used as the threshold value in the determination in step S84 in accordance with the order of the approximation, specifically, to be equal to or larger than the minimum number required for the approximation. By setting the number used as the threshold value in the determination in step S84 to be larger than the minimum number required for the approximation, the accuracy of the approximation can be improved.

Next, in step S87, the central control unit 200 determines whether the maximum recording focus balance value FMax is within a range of the already-measured recording focus balance values. Specifically, it is determined whether the maximum recording focus balance value FMax is between the smallest and the largest of the already-measured recording focus balance values.

If it is determined in step S87 that the maximum recording focus balance value FMax is outside the already-measured range (if NO), the central control unit 200 returns to step S85 to set the recording focus balance value for the next measurement, and returns to step S82.

If it is determined in step S87 that the maximum recording focus balance value FMax is within the already-measured range (if YES), the processing proceeds to step S88. Thus, until the determination in step S87 is YES, the process of steps S85, S82, S83, S84, S86, and S87 is performed repeatedly, and when the determination in step S87 is YES, the processing proceeds to step S88.

In step S88, the central control unit 200 sets the maximum recording focus balance value FMax as the focus balance value for recording, and ends the adjustment of the focus balance value for recording.

This embodiment described above, after adjusting the spherical aberration correction amount and the focus balance value for reproduction, further adjusts the focus balance value for recording, and therefore can use an optimum or appropriate focus balance value in data recording. This makes it possible to obtain good recording quality and reduce the recording power required for recording.

In the above description, the recording focus balance value at which the reproduced signal amplitude is maximum is obtained, but it is possible to measure the reproduced signal characteristic, such as a modulation index and an asymmetry, instead of the reproduced signal amplitude, and obtain the recording focus balance value at which the reproduced signal characteristic is maximum. It is also possible to obtain the reproduced signal quality (e.g., the jitter value and i-MLSE) instead of the reproduced signal characteristic, and obtain the recording focus balance value at which the reproduced signal quality is best (or minimum).

In the above description, the recording power used for the test recording is a fixed recording power, but it is possible to perform an optimum recording power adjustment to obtain an optimum recording power at each of a plurality of recording focus balance values instead of the test recording by the fixed recording power. In this case, instead of obtaining the recording focus balance value at which the reproduced signal amplitude is maximum, the recording focus balance value having the smallest optimum recording power among the plurality of recording focus balance values may be obtained. Here, it is not mandatory to use the optimum recording power; it is possible to obtain, for each of a plurality of recording focus balance values, a recording power for obtaining a common reproduced signal characteristic by, for example, measuring a relationship between the recording power and reproduced signal characteristic (one of the modulation index, asymmetry, and amplitude), and obtain the recording focus balance value with the smallest recording power.

In the above description, of the spherical aberration correction amount for recording and the focus balance value for recording, only the latter is adjusted, but both of them may be adjusted in the same manner as the adjustment of the spherical aberration correction amount and focus balance value for reproduction in the first to third embodiments. Specifically, as in the first to third embodiments, the spherical aberration correction amount and focus balance value for recording may be adjusted by measuring the signal characteristic of the reproduced signal at each measurement point, performing the ellipse approximation on the measurement results, and obtaining the center of the ellipse. In this case, in the measurements of the signal characteristics, test recording is performed at each measurement point by changing the spherical aberration correction amount and focus balance value during recording, the test-recorded signals are reproduced, and the signal characteristics of the reproduced signals are measured. At this time, in the reproduction of the test-recorded signals, for the respective measurement points, common values (i.e., fixed values) are used as the spherical aberration correction amount and focus balance value during reproduction.

The present invention is not limited to the embodiments described above; it can be practiced in various other aspects without departing from the inventive scope.

REFERENCE CHARACTERS 100 optical information processing apparatus, 110 head amplifier, 120 reproduced signal processing unit, 121 signal quality measurement unit, 122 data decoder, 123 reproducing characteristic measurement unit, 130 FE signal generating unit, 140 TE signal generating unit, 141 TE signal characteristic measurement unit, 150 sled motor control unit, 151 sled motor, 160 spherical aberration correction unit, 170 actuator control unit, 180 spindle motor control unit, 181 spindle motor, 200 central control unit, 201 focus adjustment unit, 202 adjustment unit, 210 CPU, 220 ROM, 230 RAM, 300 optical head (optical pickup), 310 semiconductor laser, 320 laser driving circuit, 330 collimator lens, 340 beam splitter, 350 objective lens, 360 detection lens, 370 light receiving element, 380 spherical aberration correction lens, 390 actuator, 400 host controller, 500 optical disc.

What is claimed is:

1. An optical information processing apparatus comprising:
a light radiation reception unit that radiates light onto an optical disc and detects light reflected from the optical disc to output a reproduced signal;
a spherical aberration correction unit that corrects spherical aberration of the light radiated onto the optical disc;
a focus adjustment unit that adjusts, based on a focus adjustment value, a focus position of the light radiated onto the optical disc; and
an adjustment unit that measures a signal characteristic of the reproduced signal at each of at least three measurement positions on each of at least three straight lines on a plane with coordinate axes representing an amount of spherical aberration correction by the spherical aberration correction unit and the focus adjustment value, obtains, from the results of the measurements, as estimated positions, at least five positions on the plane at which the signal characteristic has substantially the same value, and adjusts the amount of spherical aberration correction and the focus adjustment value based on the at least five estimated positions; wherein the adjustment unit performs an ellipse approximation on the at least five estimated positions, obtains a center of the ellipse from the result of the ellipse approximation, and determines the amount of spherical aberration correction and the focus adjustment value based on the center of the ellipse.

2. The optical information processing apparatus of claim 1, wherein:

the at least three straight lines includes a focus axis straight line parallel to the coordinate axis of the focus adjustment value and at least two remaining straight lines different from the focus axis straight line; and the adjustment unit, after measuring the signal characteristics at at least three measurement positions on the focus axis straight line, sequentially changes the amount of spherical aberration correction, and each time the amount of spherical aberration correction is changed, measures the signal characteristic at a measurement position at the changed amount of spherical aberration correction on each of the remaining straight lines, thereby measuring the signal characteristic at each of the at least three measurement positions on each of the at least three straight lines.

3. The optical information processing apparatus of claim 1, wherein for each of the straight lines, the adjustment unit measures the signal characteristic while changing the measurement position so as to extend a range of the measurement positions until the range of the measurement positions includes a position at which the signal characteristic has an extreme value when a relationship between the measurement position and the signal characteristic measured at the measurement position is approximated by a second or higher order polynomial.

4. The optical information processing apparatus of claim 1, wherein when a contour line of the signal characteristic on the plane is regarded as an ellipse, the at least three straight lines include a straight line inclined with respect to the coordinate axes of the amount of spherical aberration correction and the focus adjustment value and parallel to a long axis of the ellipse.

5. The optical information processing apparatus of claim 1, wherein for each of the straight lines, from an approximation result obtained by approximating a relationship between the measurement position and the signal characteristic measured at the measurement position by a second or higher order polynomial, the adjustment unit obtains, as the estimated positions, one or more positions on the plane at which the signal characteristic has a predetermined value, and performs the ellipse approximation using at least five of the obtained estimated positions.

6. The optical information processing apparatus of claim 5, claim 1, wherein the adjustment unit:

makes a determination as to whether the result of the ellipse approximation represents an ellipse;

if it is determined that no ellipse is represented, obtains the at least five estimated positions after changing the value of the signal characteristic, performs the ellipse approximation using the at least five estimated positions, and then makes the determination again; and if it is determined that an ellipse is represented, obtains the center of the ellipse from the result of the ellipse approximation.

7. The optical information processing apparatus of claim 1, wherein the adjustment unit:

for each of a plurality of values of the signal characteristic, obtains the at least five estimated positions, performs an ellipse approximation on the at least five estimated positions, and obtains an error between the result of the ellipse approximation and the at least five estimated positions; and obtains the center of the ellipse from the result of the ellipse approximation having the smallest error among the plurality of results of the ellipse approximations corresponding to the plurality of values.

8. The optical information processing apparatus of claim 1, wherein the adjustment unit determines the validity of the measurements, and if it is determined that the measurements are invalid, measures the signal characteristic at an additional measurement position and performs the adjustment from the measurement results including the signal characteristic measured at the additional measurement position.

9. The optical information processing apparatus of claim 1, further comprising a recording adjustment unit that adjusts a focus adjustment value for recording used during recording on the optical disc, wherein the recording adjustment unit performs test recording on the optical disc using a fixed recording power while changing the focus adjustment value, reproduces the signals recorded by the test recording with a fixed focus adjustment value to measure signal characteristics of the reproduced signals, approximates a relationship between the focus adjustment value and the measured signal characteristic by a second or higher order polynomial, obtains, from the result of the approximation, a focus adjustment value at which the signal characteristic is maximum, and determines the obtained focus adjustment value as the focus adjustment value for recording.

10. An optical information processing method comprising:

a light radiation reception step for radiating light onto an optical disc and detecting light reflected from the optical disc to output a reproduced signal;

a spherical aberration correction step for correcting spherical aberration of the light radiated onto the optical disc;

a focus adjustment step for adjusting, based on a focus adjustment value, a focus position of the light radiated onto the optical disc; and an adjustment step for measuring a signal characteristic of the reproduced signal at each of at least three measurement positions on each of at least three straight lines on a plane with coordinate axes representing an amount of spherical aberration correction by the spherical aberration correction step and the focus adjustment value, obtaining, from the results of the measurements, as estimated positions, at least five positions on the plane at which the signal characteristic has substantially the same value, and adjusting the amount of spherical aberration correction and the focus adjustment value based on the at least five estimated positions; wherein the adjustment step performs an ellipse approximation on the at least five estimated positions, obtains a center of the ellipse from the result of the ellipse approximation, and determines the amount of spherical aberration correction and the focus adjustment value based on the center of the ellipse.

11. The optical information processing method of claim 10, wherein:
the at least three straight lines includes a focus axis straight line parallel to the coordinate axis of the focus adjustment value and at least two remaining straight lines different from the focus axis straight line; and
the adjustment step, after measuring the signal characteristics at at least three measurement positions on the focus axis straight line, sequentially changes the amount of spherical aberration correction, and each time the amount of spherical aberration correction is changed, measures the signal characteristic at a measurement position at the changed amount of spherical aberration correction on each of the remaining straight lines, thereby measuring the signal characteristic at each of the at least three measurement positions on each of the at least three straight lines.

12. The optical information processing method of claim 10, wherein for each of the straight lines, the adjustment step measures the signal characteristic while changing the measurement position so as to extend a range of the measurement positions until the range of the measurement positions includes a position at which the signal characteristic has an extreme value when a relationship between the measurement position and the signal characteristic measured at the measurement position is approximated by a second or higher order polynomial.

13. The optical information processing method of claim 10, wherein when a contour line of the signal characteristic on the plane is regarded as an ellipse, the at least three straight lines include a straight line inclined with respect to the coordinate axes of the amount of spherical aberration correction and the focus adjustment value and parallel to a long axis of the ellipse.

14. The optical information processing method of claim 10, wherein for each of the straight lines, from an approximation result obtained by approximating a relationship between the measurement position and the signal characteristic measured at the measurement position by a second or higher order polynomial, the adjustment step obtains, as the estimated positions, one or more positions on the plane at which the signal characteristic has a predetermined value, and performs the ellipse approximation using at least five of the obtained estimated positions.

15. The optical information processing method of claim 10, wherein the adjustment step:
makes a determination as to whether the result of the ellipse approximation represents an ellipse;
if it is determined that no ellipse is represented, obtains the at least five estimated positions after changing the value of the signal characteristic, performs the ellipse approximation using the at least five estimated positions, and then makes the determination again; and
if it is determined that an ellipse is represented, obtains the center of the ellipse from the result of the ellipse approximation.

16. The optical information processing method of claim 10, wherein the adjustment step:
for each of a plurality of values of the signal characteristic, obtains the at least five estimated positions, performs an ellipse approximation on the at least five estimated positions, and obtains an error between the result of the ellipse approximation and the at least five estimated positions; and
obtains the center of the ellipse from the result of the ellipse approximation having the smallest error among the plurality of results of the ellipse approximations corresponding to the plurality of values.

17. The optical information processing method of claim 10, wherein the adjustment step determines the validity of the measurements, and if it is determined that the measurements are invalid, measures the signal characteristic at an additional measurement position and performs the adjustment from the measurement results including the signal characteristic measured at the additional measurement position.

18. The optical information processing method of claim 10, further comprising a recording adjustment step for adjusting a focus adjustment value for recording used during recording on the optical disc, wherein
the recording adjustment step performs test recording on the optical disc using a fixed recording power while changing the focus adjustment value, reproduces the signals recorded by the test recording with a fixed focus adjustment value to measure signal characteristics of the reproduced signals, approximates a relationship between the focus adjustment value during recording and the measured signal characteristic by a second or higher order polynomial, obtains, from the result of the approximation, a focus adjustment value during recording at which the signal characteristic is maximum, and determines the obtained focus adjustment value as the focus adjustment value for recording.

19. An adjustment method for an optical information processing apparatus including a light radiation reception unit that radiates light onto an optical disc and detects light reflected from the optical disc to output a reproduced signal, a spherical aberration correction unit that corrects spherical aberration of the light radiated onto the optical disc, and a focus adjustment unit that adjusts a focus position of the light radiated onto the optical disc based on a focus adjustment value, the adjustment method comprising
an adjustment step for measuring a signal characteristic of the reproduced signal at each of at least three measurement positions on each of at least three straight lines on a plane with coordinate axes representing an amount of spherical aberration correction by the spherical aberration correction means and the focus adjustment value, obtaining, from the results of the measurements, as estimated positions, at least five positions on the plane at which the signal characteristic has substantially the same value, and adjusting the amount of spherical aberration correction and the focus adjustment value based on the at least five estimated positions, wherein
the adjustment step performs an ellipse approximation on the at least five estimated positions, obtains a center of the ellipse from the result of the ellipse approximation, and determines the amount of spherical aberration correction and the focus adjustment value based on the center of the ellipse.

* * * * *